US012754203B2

(12) United States Patent
Sawai et al.

(10) Patent No.: US 12,754,203 B2
(45) Date of Patent: Oct. 6, 2026

(54) ROTATION DETECTOR INCLUDING A CONTROLLER TO OBTAIN STATES OF DETECTION COILS

(71) Applicant: Mitsubishi Electric Corporation, Tokyo (JP)

(72) Inventors: Takatsugu Sawai, Tokyo (JP); Akihiko Higuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 84 days.

(21) Appl. No.: 18/725,833

(22) PCT Filed: Dec. 19, 2022

(86) PCT No.: PCT/JP2022/046666
§ 371 (c)(1),
(2) Date: Jul. 1, 2024

(87) PCT Pub. No.: WO2023/140000
PCT Pub. Date: Jul. 27, 2023

(65) Prior Publication Data
US 2025/0060391 A1 Feb. 20, 2025

(30) Foreign Application Priority Data
Jan. 19, 2022 (JP) ................................ 2022-006271

(51) Int. Cl.
*G01P 13/04* (2006.01)

(52) U.S. Cl.
CPC .................................... *G01P 13/04* (2013.01)

(58) Field of Classification Search
CPC ..... G01C 21/183; G01C 21/188; G01P 3/481; G01P 3/4815; G01P 3/487
See application file for complete search history.

(56) References Cited

U.S. PATENT DOCUMENTS 5,349,257 A * 9/1994 Hernden .................. H02P 9/00 310/156.28
2003/0177272 A1* 9/2003 Shimosakoda ...... H04B 1/7183 709/248

(Continued)

FOREIGN PATENT DOCUMENTS

WO 2013/157279 A1 10/2013

OTHER PUBLICATIONS

International Search Report and Written Opinion mailed on Feb. 14, 2023, received for PCT Application PCT/JP2022/046666, filed on Dec. 19, 2022, 8 pages including English Translation.

*Primary Examiner* — Huy Q Phan
*Assistant Examiner* — Temilade S Rhodes-Vivour
(74) *Attorney, Agent, or Firm* — XSENSUS LLP

(57) ABSTRACT

Detection coils generate a positive or negative voltage pulse. Every time a voltage pulse is generated, a controller operates upon receipt of electric power of the voltage pulse, obtains states of the detection coils, information on the detection coil that has generated the voltage pulse, and the number of rotations of a rotation shaft, and updates a non-volatile memory. During the update, by referring to information on a current voltage pulse, and states of the detection coil in generation of the last voltage pulse and the last but one voltage pulse, and a history of information on the detection coil that has generated the last but one voltage pulse, which are held in the non-volatile memory, the controller detects a pulse dropout and corrects the states of the detection coils and the number of rotations held in the non-volatile memory.

14 Claims, 15 Drawing Sheets

(56) References Cited

U.S. PATENT DOCUMENTS

| | | | | |
|---|---|---|---|---|
| 2007/0065128 | A1* | 3/2007 | Liao | G03B 17/00 396/55 |
| 2015/0015245 | A1 | 1/2015 | Inoue et al. | |
| 2015/0130450 | A1* | 5/2015 | Gehringer | G01D 5/3473 324/207.25 |
| 2015/0338245 | A1* | 11/2015 | Tatei | G01D 5/244 324/207.17 |
| 2015/0354986 | A1* | 12/2015 | Mehnert | G01D 5/2046 324/207.16 |

* cited by examiner

FIG.8

| BEFORE UPDATE | | | | | | | | | POWER GENERATION ELEMENT INPUT | | | AFTER UPDATE | | | | | | | | | STATE DESCRIPTION |
|---|---|---|---|---|---|---|---|---|---|---|---|---|---|---|---|---|---|---|---|---|---|
| CURRENT STATUS | | | | LAST STATUS | | | | THE LAST BUT ONE DETECTION COIL NUMBER | | | | MULTIPLE-ROTATION COUNTER | CURRENT STATUS | | | | LAST STATUS | | | | |
| AREA | STATE A | STATE B | STATE C | AREA | STATE A | STATE B | STATE C | | A PHASE | B PHASE | C PHASE | | AREA | STATE A | STATE B | STATE C | AREA | STATE A | STATE B | STATE C | |
| 1 | H | L | L | 6 | H | H | L | | L | 0 | 0 | 0 | 2 | L | L | L | 1 | H | L | L | |
| | | | | 2 | L | L | L | | | | | | | | | | | | | | |
| | | | | 6 | H | H | L | | 0 | H | 0 | −1 | 6 | H | H | L | 1 | H | L | L | |
| | | | | 2 | L | L | L | | | | | | | | | | | | | | |
| | | | | 6 | H | H | L | | 0 | L | 0 | 0 | 1 | H | L | L | 6 | H | H | L | |
| | | | | 2 | L | L | L | C PHASE | | | | 0 | 3 | L | L | H | 4 | L | H | H | |
| | | | | 2 | L | L | L | | H | 0 | 0 | 0 | 1 | H | L | L | 2 | L | L | L | |
| | | | | 6 | H | H | L | C PHASE | | | | −1 | 5 | H | H | H | 4 | L | H | H | |
| | | | | 2 | L | L | L | | 0 | 0 | H | 0 | 3 | L | L | H | 2 | L | L | L | REVERSE + PULSE DROPOUT (SECOND EXAMPLE) |
| | | | | 6 | H | H | L | | | | | −1 | 5 | H | H | H | 6 | H | H | L | REVERSE + PULSE DROPOUT (FIRST EXAMPLE) |
| | | | | 6 | H | H | L | C PHASE | 0 | 0 | L | −1 | 2 | L | L | L | 3 | L | L | H | |
| | | | | 2 | L | L | L | C PHASE | | | | 0 | 6 | H | H | L | 5 | H | H | H | |
| 2 | L | L | L | 1 | H | L | L | | 0 | 0 | H | 0 | 3 | L | L | H | 2 | L | L | L | |
| | | | | 3 | L | L | H | | | | | | | | | | | | | | |
| | | | | 1 | H | L | L | | H | 0 | 0 | 0 | 1 | H | L | L | 2 | L | L | L | |
| | | | | 3 | L | L | H | | | | | | | | | | | | | | |
| | | | | 1 | H | L | L | | L | 0 | 0 | 0 | 2 | L | L | L | 1 | H | L | L | |
| | | | | 3 | L | L | H | B PHASE | | | | 0 | 4 | L | H | H | 5 | H | H | H | |
| | | | | 3 | L | L | H | | 0 | 0 | L | 0 | 2 | L | L | L | 3 | L | L | H | |
| | | | | 1 | H | L | L | B PHASE | | | | −1 | 6 | H | H | L | 5 | H | H | H | |
| | | | | 3 | L | L | H | | 0 | H | 0 | 0 | 4 | L | H | H | 3 | L | L | H | |
| | | | | 1 | H | L | L | | | | | −1 | 6 | H | H | L | 1 | H | L | L | |
| | | | | 1 | H | L | L | B PHASE | 0 | L | 0 | −1 | 3 | L | L | H | 4 | L | H | H | REVERSE + CONTINUOUS PULSE DROPOUT (FOURTH EXAMPLE) |
| | | | | 3 | L | L | H | B PHASE | | | | 1 | 1 | H | L | L | 6 | H | H | L | |
| 3 | L | L | H | 2 | L | L | L | | 0 | H | 0 | 0 | 4 | L | H | H | 3 | L | L | H | |
| | | | | 4 | L | H | H | | | | | | | | | | | | | | |
| | | | | 2 | L | L | L | | 0 | 0 | L | 0 | 2 | L | L | L | 3 | L | L | H | |
| | | | | 4 | L | H | H | | | | | | | | | | | | | | |
| | | | | 2 | L | L | L | | 0 | 0 | H | 0 | 3 | L | L | H | 2 | L | L | L | |
| | | | | 4 | L | H | H | A PHASE | | | | 0 | 5 | H | H | H | 6 | H | H | L | |
| | | | | 4 | L | H | H | | 0 | L | 0 | 0 | 3 | L | L | H | 4 | L | H | H | |
| | | | | 2 | L | L | L | A PHASE | | | | 0 | 1 | H | L | L | 6 | H | H | L | |
| | | | | 4 | L | H | H | | H | 0 | 0 | 0 | 5 | H | H | H | 4 | L | H | H | |
| | | | | 2 | L | L | L | | | | | 0 | 1 | H | L | L | 2 | L | L | L | |
| | | | | 2 | L | L | L | A PHASE | L | 0 | 0 | −1 | 4 | L | H | H | 5 | H | H | H | |
| | | | | 4 | L | H | H | A PHASE | | | | 1 | 2 | L | L | L | 1 | H | L | L | |

FIG.9

| BEFORE UPDATE | | | | | | | | | POWER GENERATION ELEMENT INPUT | | | AFTER UPDATE | | | | | | | | | STATE DESCRIPTION |
|---|---|---|---|---|---|---|---|---|---|---|---|---|---|---|---|---|---|---|---|---|---|
| CURRENT STATUS | | | | LAST STATUS | | | | THE LAST BUT ONE DETECTION COIL NUMBER | | | | MULTIPLE-ROTATION COUNTER | CURRENT STATUS | | | | LAST STATUS | | | | |
| AREA | STATE A | STATE B | STATE C | AREA | STATE A | STATE B | STATE C | | A PHASE | B PHASE | C PHASE | | AREA | STATE A | STATE B | STATE C | AREA | STATE A | STATE B | STATE C | |
| 4 | L | H | H | 3 | L | L | H | | H | 0 | 0 | 0 | 5 | H | H | H | 4 | L | H | H | |
| | | | | 5 | H | H | H | | | | | | | | | | | | | | |
| | | | | 3 | L | L | H | | 0 | L | 0 | 0 | 3 | L | L | H | 4 | L | H | H | |
| | | | | 5 | H | H | H | | | | | | | | | | | | | | |
| | | | | 3 | L | L | H | | 0 | H | 0 | 0 | 4 | L | H | H | 3 | L | L | H | |
| | | | | 5 | H | H | H | C PHASE | | | | 0 | 6 | H | H | L | 1 | H | L | L | |
| | | | | 5 | H | H | H | | L | 0 | 0 | 0 | 4 | L | H | H | 5 | H | H | H | |
| | | | | 3 | L | L | H | C PHASE | | | | 0 | 2 | L | L | L | 1 | H | L | L | |
| | | | | 5 | H | H | H | | 0 | 0 | L | 0 | 6 | H | H | L | 5 | H | H | H | |
| | | | | 3 | L | L | H | | | | | 0 | 2 | L | L | L | 3 | L | L | H | |
| | | | | 3 | L | L | H | C PHASE | 0 | 0 | H | −1 | 5 | H | H | H | 6 | H | H | L | |
| | | | | 5 | H | H | H | C PHASE | | | | 1 | 3 | L | L | H | 2 | L | L | L | |
| 5 | H | H | H | 4 | L | H | H | | 0 | 0 | L | 0 | 6 | H | H | L | 5 | H | H | H | |
| | | | | 6 | H | H | L | | | | | | | | | | | | | | |
| | | | | 4 | L | H | H | | L | 0 | 0 | 0 | 4 | L | H | H | 5 | H | H | H | |
| | | | | 6 | H | H | L | | | | | | | | | | | | | | |
| | | | | 4 | L | H | H | | H | 0 | 0 | 0 | 5 | H | H | H | 4 | L | H | H | |
| | | | | 6 | H | H | L | B PHASE | | | | 1 | 1 | H | L | L | 2 | L | L | L | |
| | | | | 6 | H | H | L | | 0 | 0 | H | 0 | 5 | H | H | H | 6 | H | H | L | |
| | | | | 4 | L | H | H | B PHASE | | | | 0 | 3 | L | L | H | 2 | L | L | L | |
| | | | | 6 | H | H | L | | 0 | L | 0 | 1 | 1 | H | L | L | 6 | H | H | L | |
| | | | | 4 | L | H | H | | | | | 0 | 3 | L | L | H | 4 | L | H | H | |
| | | | | 4 | L | H | H | B PHASE | 0 | H | 0 | −1 | 6 | H | H | L | 1 | H | L | L | |
| | | | | 6 | H | H | L | B PHASE | | | | 1 | 4 | L | H | H | 3 | L | L | H | PULSE DROPOUT EXAMPLE (THIRD EXAMPLE) |
| 6 | H | H | L | 5 | H | H | H | | 0 | L | 0 | 1 | 1 | H | L | L | 6 | H | H | L | |
| | | | | 1 | H | L | L | | | | | | | | | | | | | | |
| | | | | 5 | H | H | H | | 0 | 0 | H | 0 | 5 | H | H | H | 6 | H | H | L | |
| | | | | 1 | H | L | L | | | | | | | | | | | | | | |
| | | | | 5 | H | H | H | | 0 | 0 | L | 0 | 6 | H | H | L | 5 | H | H | H | |
| | | | | 1 | H | L | L | A PHASE | | | | 1 | 2 | L | L | L | 3 | L | L | H | |
| | | | | 1 | H | L | L | | 0 | H | 0 | 0 | 6 | H | H | L | 1 | H | L | L | |
| | | | | 5 | H | H | H | A PHASE | | | | 0 | 4 | L | H | H | 3 | L | L | H | |
| | | | | 1 | H | L | L | | L | 0 | 0 | 1 | 2 | L | L | L | 1 | H | L | L | |
| | | | | 5 | H | H | H | | | | | 0 | 4 | L | H | H | 5 | H | H | H | |
| | | | | 5 | H | H | H | A PHASE | H | 0 | 0 | 0 | 1 | H | L | L | 2 | L | L | L | |
| | | | | 1 | H | L | L | A PHASE | | | | 1 | 5 | H | H | H | 4 | L | H | H | |

FIG.12

| BEFORE UPDATE | | | | | | | | | POWER GENERATION ELEMENT INPUT | | | AFTER UPDATE | | | | | | | | | | STATE DESCRIPTION |
|---|---|---|---|---|---|---|---|---|---|---|---|---|---|---|---|---|---|---|---|---|---|---|
| CURRENT STATUS | | | | LAST STATUS | | | | THE LAST BUT ONE DETECTION COIL NUMBER | | | | MULTIPLE-ROTATION COUNTER | CORRECTION EXECUTION FLAG | CURRENT STATUS | | | | LAST STATUS | | | | |
| AREA | STATE A | STATE B | STATE C | AREA | STATE A | STATE B | STATE C | | A PHASE | B PHASE | C PHASE | | | AREA | STATE A | STATE B | STATE C | AREA | STATE A | STATE B | STATE C | |
| 1 | H | L | L | 6 | H | H | L | | L | 0 | 0 | 0 | 0 | 2 | L | L | L | 1 | H | L | L | |
| | | | | 2 | L | L | L | | | | | | | | | | | | | | | |
| | | | | 6 | H | H | L | | 0 | H | 0 | −1 | 0 | 6 | H | H | L | 1 | H | L | L | |
| | | | | 2 | L | L | L | | | | | | | | | | | | | | | |
| | | | | 6 | H | H | L | | 0 | L | 0 | 0 | 0 | 1 | H | L | L | 6 | H | H | L | |
| | | | | 2 | L | L | L | C PHASE | | | | 0 | 1 | 3 | L | L | H | 4 | L | H | H | |
| | | | | 2 | L | L | L | | H | 0 | 0 | 0 | 0 | 1 | H | L | L | 2 | L | L | L | |
| | | | | 6 | H | H | L | C PHASE | | | | −1 | 1 | 5 | H | H | H | 4 | L | H | H | |
| | | | | 2 | L | L | L | | 0 | 0 | H | 0 | 0 | 3 | L | L | H | 2 | L | L | L | |
| | | | | 6 | H | H | L | | | | | −1 | 0 | 5 | H | H | H | 6 | H | H | L | |
| | | | | 6 | H | H | L | C PHASE | 0 | 0 | L | −1 | 1 | 2 | L | L | L | 3 | L | L | H | |
| | | | | 2 | L | L | L | C PHASE | | | | 0 | 1 | 6 | H | H | L | 5 | H | H | H | |
| 2 | L | L | L | 1 | H | L | L | | 0 | 0 | H | 0 | 0 | 3 | L | L | H | 2 | L | L | L | |
| | | | | 3 | L | L | H | | | | | | | | | | | | | | | |
| | | | | 1 | H | L | L | | H | 0 | 0 | 0 | 0 | 1 | H | L | L | 2 | L | L | L | |
| | | | | 3 | L | L | H | | | | | | | | | | | | | | | |
| | | | | 1 | H | L | L | | L | 0 | 0 | 0 | 0 | 2 | L | L | L | 1 | H | L | L | |
| | | | | 3 | L | L | H | B PHASE | | | | 0 | 1 | 4 | L | H | H | 5 | H | H | H | |
| | | | | 3 | L | L | H | | 0 | 0 | L | 0 | 0 | 2 | L | L | L | 3 | L | L | H | |
| | | | | 1 | H | L | L | B PHASE | | | | −1 | 1 | 6 | H | H | L | 5 | H | H | H | |
| | | | | 3 | L | L | H | | 0 | H | 0 | 0 | 0 | 4 | L | H | H | 3 | L | L | H | |
| | | | | 1 | H | L | L | | | | | −1 | 0 | 6 | H | H | L | 1 | H | L | L | |
| | | | | 1 | H | L | L | B PHASE | 0 | L | 0 | −1 | 1 | 3 | L | L | H | 4 | L | H | H | |
| | | | | 3 | L | L | H | B PHASE | | | | 1 | 1 | 1 | H | L | L | 6 | H | H | L | |
| 3 | L | L | H | 2 | L | L | L | | 0 | H | 0 | 0 | 0 | 4 | L | H | H | 3 | L | L | H | |
| | | | | 4 | L | H | H | | | | | | | | | | | | | | | |
| | | | | 2 | L | L | L | | 0 | 0 | L | 0 | 0 | 2 | L | L | L | 3 | L | L | H | |
| | | | | 4 | L | H | H | | | | | | | | | | | | | | | |
| | | | | 2 | L | L | L | | 0 | 0 | H | 0 | 0 | 3 | L | L | H | 2 | L | L | L | |
| | | | | 4 | L | H | H | A PHASE | | | | 0 | 1 | 5 | H | H | H | 6 | H | H | L | |
| | | | | 4 | L | H | H | | 0 | L | 0 | 0 | 0 | 3 | L | L | H | 4 | L | H | H | |
| | | | | 2 | L | L | L | A PHASE | | | | 0 | 1 | 1 | H | L | L | 6 | H | H | L | |
| | | | | 4 | L | H | H | | H | 0 | 0 | 0 | 0 | 5 | H | H | H | 4 | L | H | H | |
| | | | | 2 | L | L | L | | | | | 0 | 0 | 1 | H | L | L | 2 | L | L | L | |
| | | | | 2 | L | L | L | A PHASE | L | 0 | 0 | −1 | 1 | 4 | L | H | H | 5 | H | H | H | |
| | | | | 4 | L | H | H | A PHASE | | | | 1 | 1 | 2 | L | L | L | 1 | H | L | L | |

FIG.13

| BEFORE UPDATE | | | | | | | | | POWER GENERATION ELEMENT INPUT | | | | | AFTER UPDATE | | | | | | | | STATE DESCRIPTION |
|---|---|---|---|---|---|---|---|---|---|---|---|---|---|---|---|---|---|---|---|---|---|---|
| CURRENT STATUS | | | | LAST STATUS | | | | THE LAST BUT ONE DETECTION COIL NUMBER | | | | MULTIPLE-ROTATION COUNTER | CORRECTION EXECUTION FLAG | CURRENT STATUS | | | | LAST STATUS | | | | |
| AREA | STATE A | STATE B | STATE C | AREA | STATE A | STATE B | STATE C | | A PHASE | B PHASE | C PHASE | | | AREA | STATE A | STATE B | STATE C | AREA | STATE A | STATE B | STATE C | |
| 4 | L | H | H | 3 | L | L | H | | H | 0 | 0 | 0 | 0 | 5 | H | H | H | 4 | L | H | H | |
| | | | | 5 | H | H | H | | | | | | | | | | | | | | | |
| | | | | 3 | L | L | H | | 0 | L | 0 | 0 | 0 | 3 | L | L | H | 4 | L | H | H | |
| | | | | 5 | H | H | H | | | | | | | | | | | | | | | |
| | | | | 3 | L | L | H | | 0 | H | 0 | 0 | 0 | 4 | L | H | H | 3 | L | L | H | |
| | | | | 5 | H | H | H | C PHASE | | | | 0 | 1 | 6 | H | H | L | 1 | H | L | L | |
| | | | | 5 | H | H | H | | L | 0 | 0 | 0 | 0 | 4 | L | H | H | 5 | H | H | H | |
| | | | | 3 | L | L | H | C PHASE | | | | 0 | 1 | 2 | L | L | L | 1 | H | L | L | |
| | | | | 5 | H | H | H | | 0 | 0 | L | 0 | 0 | 6 | H | H | L | 5 | H | H | H | |
| | | | | 3 | L | L | H | | | | | 0 | 0 | 2 | L | L | L | 3 | L | L | H | |
| | | | | 3 | L | L | H | C PHASE | 0 | 0 | H | −1 | 1 | 5 | H | H | H | 6 | H | H | L | |
| | | | | 5 | H | H | H | C PHASE | | | | 1 | 1 | 3 | L | L | H | 2 | L | L | L | |
| 5 | H | H | H | 4 | L | H | H | | 0 | 0 | L | 0 | 0 | 6 | H | H | L | 5 | H | H | H | |
| | | | | 6 | H | H | L | | | | | | | | | | | | | | | |
| | | | | 4 | L | H | H | | L | 0 | 0 | 0 | 0 | 4 | L | H | H | 5 | H | H | H | |
| | | | | 6 | H | H | L | | | | | | | | | | | | | | | |
| | | | | 4 | L | H | H | | H | 0 | 0 | 0 | 0 | 5 | H | H | H | 4 | L | H | H | |
| | | | | 6 | H | H | L | B PHASE | | | | 1 | 1 | 1 | H | L | L | 2 | L | L | L | |
| | | | | 6 | H | H | L | | 0 | 0 | H | 0 | 0 | 5 | H | H | H | 6 | H | H | L | |
| | | | | 4 | L | H | H | B PHASE | | | | 0 | 1 | 3 | L | L | H | 2 | L | L | L | |
| | | | | 6 | H | H | L | | 0 | L | 0 | 1 | 0 | 1 | H | L | L | 6 | H | H | L | |
| | | | | 4 | L | H | H | | | | | 0 | 0 | 3 | L | L | H | 4 | L | H | H | |
| | | | | 4 | L | H | H | B PHASE | 0 | H | 0 | −1 | 1 | 6 | H | H | L | 1 | H | L | L | |
| | | | | 6 | H | H | L | B PHASE | | | | 1 | 1 | 4 | L | H | H | 3 | L | L | H | |
| 6 | H | H | L | 5 | H | H | H | | 0 | L | 0 | 1 | 0 | 1 | H | L | L | 6 | H | H | L | |
| | | | | 1 | H | L | L | | | | | | | | | | | | | | | |
| | | | | 5 | H | H | H | | 0 | 0 | H | 0 | 0 | 5 | H | H | H | 6 | H | H | L | |
| | | | | 1 | H | L | L | | | | | | | | | | | | | | | |
| | | | | 5 | H | H | H | | 0 | 0 | L | 0 | 0 | 6 | H | H | L | 5 | H | H | H | |
| | | | | 1 | H | L | L | A PHASE | | | | 1 | 1 | 2 | L | L | L | 3 | L | L | H | |
| | | | | 1 | H | L | L | | 0 | H | 0 | 0 | 0 | 6 | H | H | L | 1 | H | L | L | |
| | | | | 5 | H | H | H | A PHASE | | | | 0 | 1 | 4 | L | H | H | 3 | L | L | H | |
| | | | | 1 | H | L | L | | L | 0 | 0 | 1 | 0 | 2 | L | L | L | 1 | H | L | L | |
| | | | | 5 | H | H | H | | | | | 0 | 0 | 4 | L | H | H | 5 | H | H | H | |
| | | | | 5 | H | H | H | A PHASE | H | 0 | 0 | 0 | 1 | 1 | H | L | L | 2 | L | L | L | |
| | | | | 1 | H | L | L | A PHASE | | | | 1 | 1 | 5 | H | H | H | 4 | L | H | H | |

ROTATION DETECTOR INCLUDING A CONTROLLER TO OBTAIN STATES OF DETECTION COILS

CROSS-REFERENCE TO RELATED APPLICATIONS

This application is a national stage application, pursuant to 35 U.S.C. § 371, of International Patent Application No. PCT/JP2022/046666, filed Dec. 19, 2022, which claims priority to Japanese Patent Application No. 2022-006271, filed Jan. 19, 2022, the entire contents of each are incorporated herein by reference.

TECHNICAL FIELD

The present disclosure relates to a rotation detector.

BACKGROUND ART

WO 2013/157279 (PTL 1) discloses a battery-less rotation detector that detects and holds a rotation direction and the number of rotations of a rotational shaft without being externally supplied with electric power.

The rotation detector disclosed in PTL 1 includes a magnet that rotates in synchronization with a rotation shaft, a plurality of detection coils each receiving a magnetic field from the magnet and generating a voltage pulse, and a signal processing circuit that operates when being supplied with electric power from the voltage pulse. In PTL 1, every time any of the plurality of detection coils generates a voltage pulse, a rotational position of the magnet which is estimated from the voltage pulse is held in a non-volatile memory. As not only the current rotational position of the magnet but also the last rotational position is held in the non-volatile memory, the signal processing circuit can detect occurrence of a "pulse dropout" in which a voltage pulse drops out after the reverse of the rotation direction of the rotation shaft, and estimate the correct rotational position reflecting the occurrence of the "pulse dropout".

CITATION LIST

Patent Literature

PTL 1: WO 2013/157279

SUMMARY OF INVENTION

Technical Problem

The rotation detector described in PTL 1 can handle a pulse dropout immediately after the reverse of the rotation direction of the rotation shaft, but fails to handle a pulse dropout caused by any other factor. For example, it is conceivable that a voltage pulse may not be generated due to a quality problem with a component, such as a detection coil, that generates a voltage pulse, or the voltage level of the voltage pulse may considerably decrease. In any other case, the circuit that detects a voltage pulse may fail.

In such a situation, the rotation detector described in PTL 1 operates in an unexpected manner and thus fails to estimate a rotational position, and accordingly, outputs an error. Once an error occurs, the operation of a device with an incorporated encoder cannot be continued, thus requiring work to stop and then restore the device. This leads to a fear that damage would be caused because the device cannot be operated.

The present disclosure has been made to solve such a problem. An object of the present disclosure is to increase, in a rotation detector that detects the number of rotations of a rotation shaft based on a voltage pulse generated from a detection coil, the accuracy of correcting the number of rotations for a detection dropout of the voltage pulse.

Solution to Problem

A rotation detector according to the present disclosure is a rotation detector to detect a rotation direction and a number of rotations of a rotation shaft. The rotation detector includes a rotation detection mechanism attached to the rotation shaft to detect rotations of the rotation shaft, and a signal processing circuit electrically connected to the rotation detection mechanism. The rotation detection mechanism includes a magnet and an L (L is a natural number of three or more) number of detection coils. The magnet is configured to rotate in synchronization with the rotation shaft and has an N (N is a natural number of two or more) number of magnetic poles arranged in a rotation direction. The L number of detection coils are arranged at positions displaced from each other by a predetermined phase in the rotation direction of the magnet. Each of the L number of detection coils is configured to receive a magnetic field applied from the magnet and generate a voltage pulse of a positive or negative polarity for each half cycle of a rotation cycle of the magnet. The signal processing circuit includes a constant voltage circuit to generate, every time the voltage pulse is generated, a source voltage from electric power of the voltage pulse, and a controller and a non-volatile memory to operate upon receipt of the source voltage. The non-volatile memory is configured to store states of the L number of detection coils and the number of rotations of the rotation shaft in generation of a voltage pulse, and a history of information on a detection coil that has generated the voltage pulse. The controller is configured to, every time a voltage pulse is generated, obtain the states of the L number of detection coils, the information on a detection coil that has generated the voltage pulse, and the number of rotations of the rotation shaft, and perform a process of updating the non-volatile memory. In the process of updating, by referring to information on a current voltage pulse, and states of the L number of detection coils in generation of the last voltage pulse, states of the L number of detection coils in generation of the last but one voltage pulse, and a history of information on a detection coil that has generated the last but one voltage pulse, which are held in the non-volatile memory, the controller detects a pulse dropout in which a voltage pulse drops out, and corrects the states of the L number of detection coils and the number of rotations of the rotation shaft that are to be held in the non-volatile memory.

Advantageous Effects of Invention

According to the present disclosure, the accuracy of correcting the number of rotations for a dropout of the voltage pulse can be increased in the rotation detector that detects the number of rotations of the rotation shaft based on a voltage pulse detected from the detection coil.

BRIEF DESCRIPTION OF DRAWINGS

FIG. 8 shows a conversion table used in an update process according to Embodiment 1.

FIG. 9 shows another conversion table used in the update process according to Embodiment 1.

FIG. 12 shows a conversion table used in an update process according to Embodiment 2.

FIG. 13 shows another conversion table used in the update process according to Embodiment 2.

DESCRIPTION OF EMBODIMENTS

Figure 1:
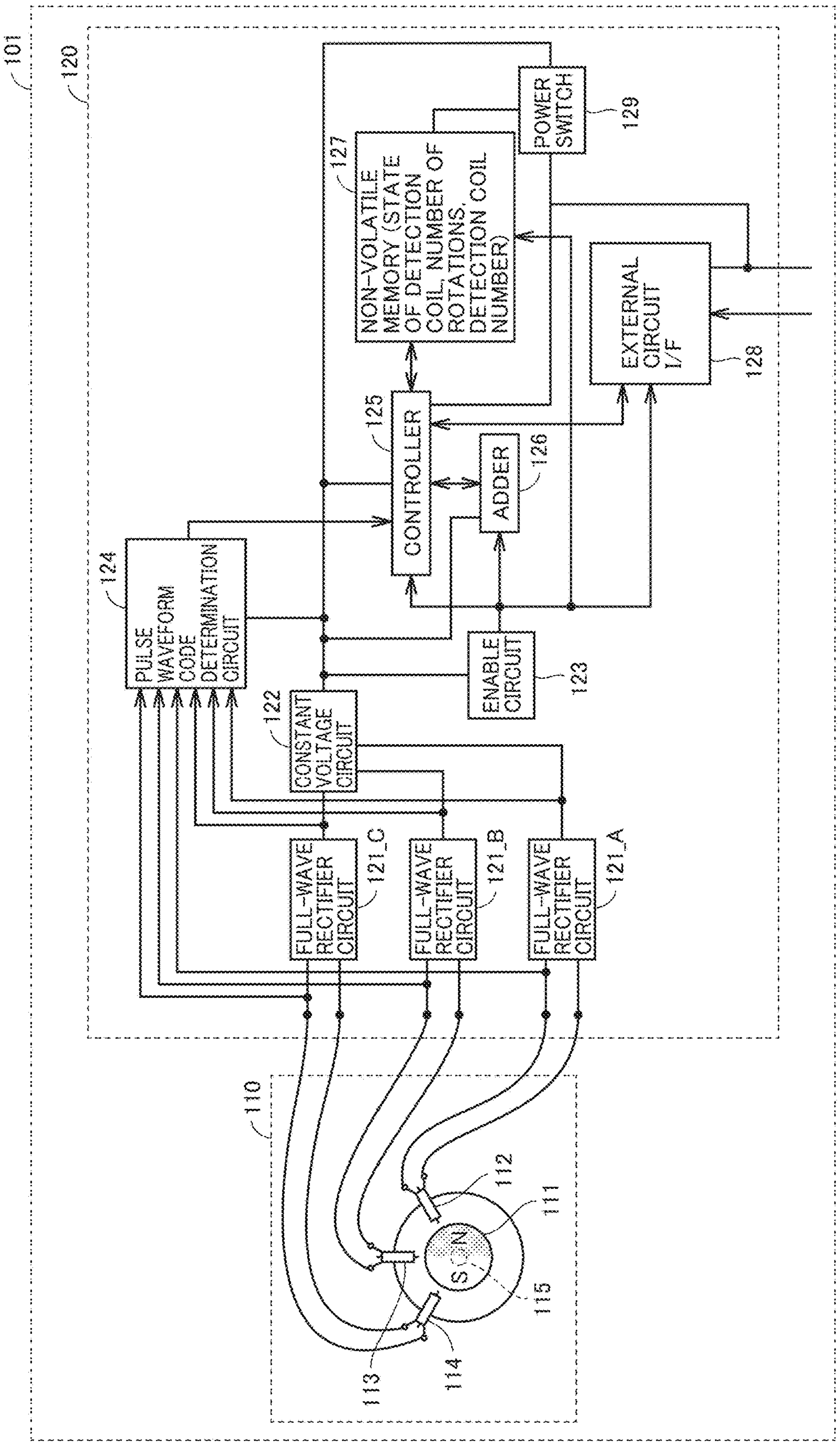
FIG. 1 shows an overall configuration of a rotation detector according to Embodiment 1.

Embodiments of the present disclosure will be described below in detail with reference to the drawings. In the drawings, the same or corresponding parts have the same reference characters allotted, and description thereof will not be repeated.

Embodiment 1

Overall Configuration of Rotation Detector

FIG. 1 shows an overall configuration of a rotation detector according to Embodiment 1. A rotation detector 101 according to Embodiment 1, which is a battery-less rotation detector, is configured to detect and hold the rotation direction and the number of rotations of a rotating body without being externally supplied with electric power.

As shown in FIG. 1, rotation detector 101 includes a rotation detection mechanism 110 and a signal processing circuit 120. Signal processing circuit 120 is electrically connected to rotation detection mechanism 110.

Rotation detection mechanism 110 is attached to a rotation shaft 115 and is configured to detect rotations of rotation shaft 115. Rotation shaft 115 is, for example, an output shaft of a motor. Rotation detection mechanism 110 is not limited to rotation shaft 115 and is applicable to a rotating body rotatable about the shaft.

Rotation detection mechanism 110 includes a magnet 111 and detection coils 112, 113, 114. Magnet 111 has a disk shape and is concentrically attached to rotation shaft 115. Magnet 111 has two magnetic poles (N pole, S pole) each corresponding to a half of the circumference. Magnet 111 rotates in a clockwise (CW) direction or a counterclockwise (CCW) direction together with rotation shaft 115. The CW direction is a direction of right-handed rotation (forward rotation) as viewed from rotation shaft 115, and the CCW direction is a direction of left-handed rotation (reverse rotation) as viewed from rotation shaft 115.

Although rotation shaft 115 and magnet 111 are arranged concentrically in the example of FIG. 1, they are only required to be configured such that magnet 111 pivots in synchronization with pivoting of rotation shaft 115. The number of magnetic poles of magnet 111 may be two or more.

Detection coils 112, 113, 114 are spaced from each other in the rotation direction of magnet 111 so as to surround the outer circumference of magnet 111. Each of detection coils 112, 113, 114 is formed of a magnetic wire having the large Barkhausen effect. The magnetic wire includes a hard magnetic body for the inner portion of the wire and a soft magnetic body for the outer portion of the wire. In the description below, detection coil 112 is also referred to as "A-phase detection coil", detection coil 113 is also referred to as "B-phase detection coil", and detection coil 114 is also referred to as "C-phase detection coil". The number of detection coils is not limited to three and is only required to be three or more.

Configuration of Rotation Detection Mechanism

Next, a configuration and an operation of rotation detection mechanism 110 shown in FIG. 1 will be described.

Figure 2:
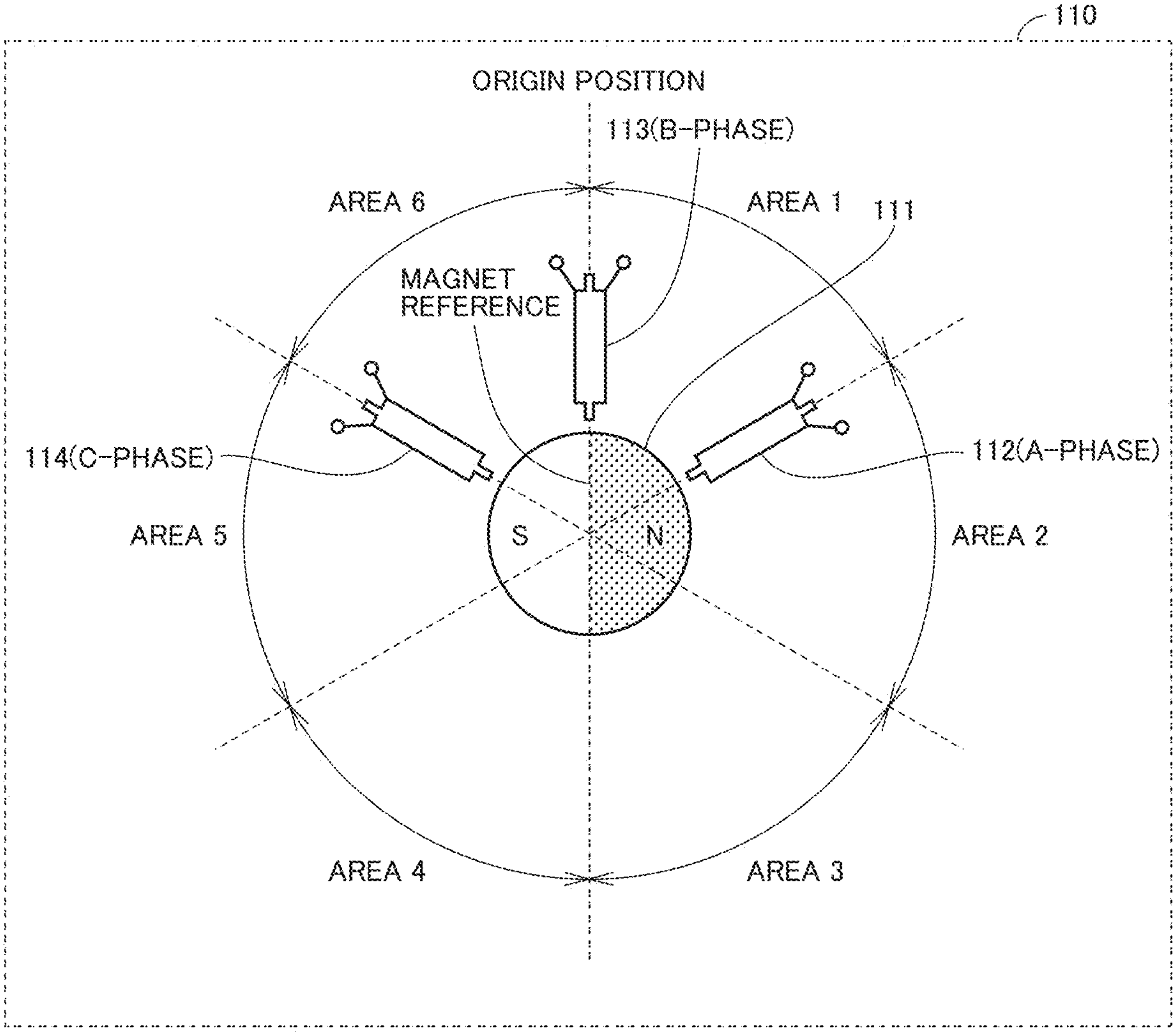
FIG. 2 shows an example configuration of a rotation detection mechanism.

FIG. 2 shows a configuration example of rotation detection mechanism 110. The positional relationship between magnet 111 and detection coils 112, 113, 114 will be described with reference to FIG. 2. Further, the logic of detecting the number of rotations of rotation shaft 115 using rotation detection mechanism 110 will be described.

As shown in FIG. 2, detection coils 112, 113, 114 are arranged at positions displaced from each other by a predetermined phase in the rotation direction of magnet 111 so as to extend radially of magnet 111. In the example of FIG. 2, at the central angle of magnet 111, A-phase detection coil 112 is arranged at a position of 60° in the CW direction from B-phase detection coil 113, and C-phase detection coil 114 is arranged at a position of 60° in the CCW direction from B-phase detection coil 113. However, the positions at which detection coils 112, 113, 114 are arranged are not limited thereto.

Then, according to the arrangement of detection coils 112, 113, 114, six angle areas are formed along the circumference of magnet 111 relative to an "origin position (0°)". Specifically, an "area 1" to an "area 6" are formed for each 60° in the CW direction with the position, at which B-phase detection coil 113 is arranged, as the "origin position". Also, in magnet 111, an angular position at which the S pole changes to the N pole in the CW direction is referred to as a "magnet reference".

Figure 3:
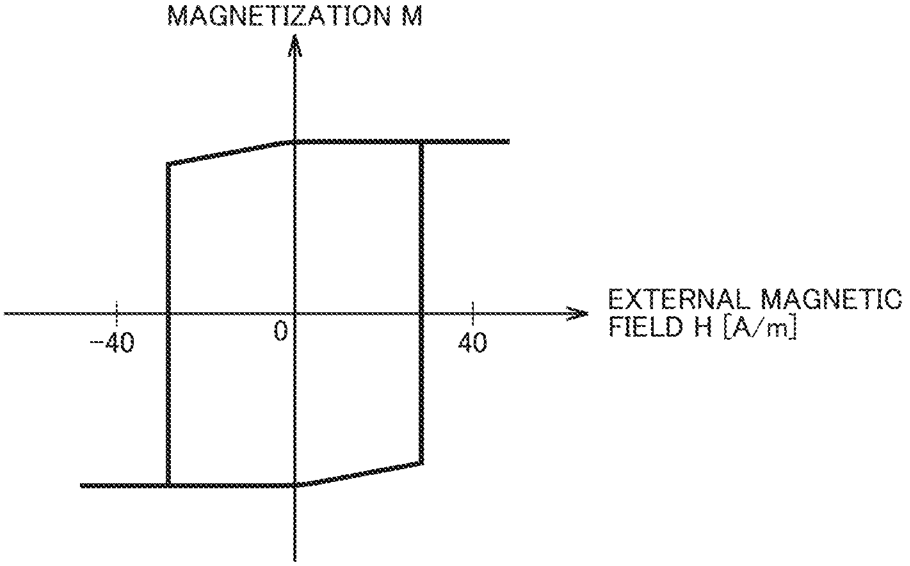
FIG. 3 schematically shows the relationship of magnetization of a magnetic wire with an external magnetic field.

In the magnetic wire forming each of detection coils 112, 113, 114, the soft magnetic body has magnetization properties as shown in FIG. 3. FIG. 3 schematically shows the relationship of magnetization M of the magnetic wire with an external magnetic field H. As shown in FIG. 3, the magnetic wire exhibits the behavior in which magnetization M reverses abruptly (large Barkhausen effect) when the intensity of external magnetic field H exceeds a certain value. The speed at which magnetization M reverses at this time is always constant irrespective of how to apply external magnetic field H. In the present embodiment, thus, the detection coils formed of magnetic wires are arranged on the outer circumference of magnet 111 that rotates together with rotation shaft 115 using such magnetization properties, thus enabling generation of a voltage pulse, which is always constant, from the detection coils irrespective of a rotation speed of rotation shaft 115 (i.e., magnet 111).

Figure 4:
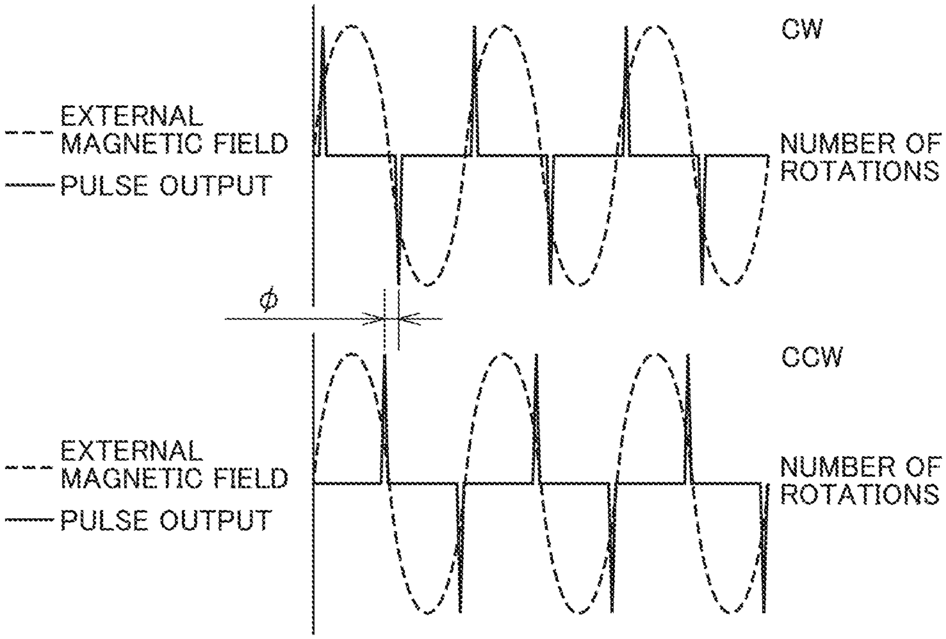
FIG. 4 shows the relationship between an external magnetic field applied from a rotating magnet to a detection coil and a voltage pulse output from the detection coil.

FIG. 4 shows the relationship between the external magnetic field applied to the detection coil from rotating magnet 111 and the voltage pulse output from the detection coil. The upper diagram of FIG. 4 shows the relationship between external magnetic field (dashed line) and voltage pulse (solid line) during rotation of magnet 111 in the CW direction. The lower diagram of FIG. 4 shows the relationship between external magnetic field (dashed line) and voltage pulse (solid line) during rotation of magnet 111 in the CCW direction.

As shown in FIG. 4, when magnet 111 rotates at a constant speed together with rotation shaft 115, the external magnetic field applied to the detection coil has a sinusoidal waveform in which a time required for magnet 111 to rotate once is one cycle.

The detection coil generates one voltage pulse for each half cycle of the external magnetic field. The detection coil generates a positive voltage pulse in a positive half cycle of the external magnetic field and generates a negative voltage pulse in a negative half cycle of the external magnetic field. Thus, detection of this voltage pulse allows rotation detector 101 to count the number of rotations of rotation shaft 115. Also, use of electric power of this voltage pulse can implement battery-less rotation detector 101.

The timings at which the positive and negative voltage pulses are generated differ depending on the rotation direction of magnet 111. In FIG. 4, the position at which the voltage pulse is generated in the CW direction and the position at which the voltage pulse is generated in the CCW direction are displaced from each other by an angle $\phi$.

Figure 5:
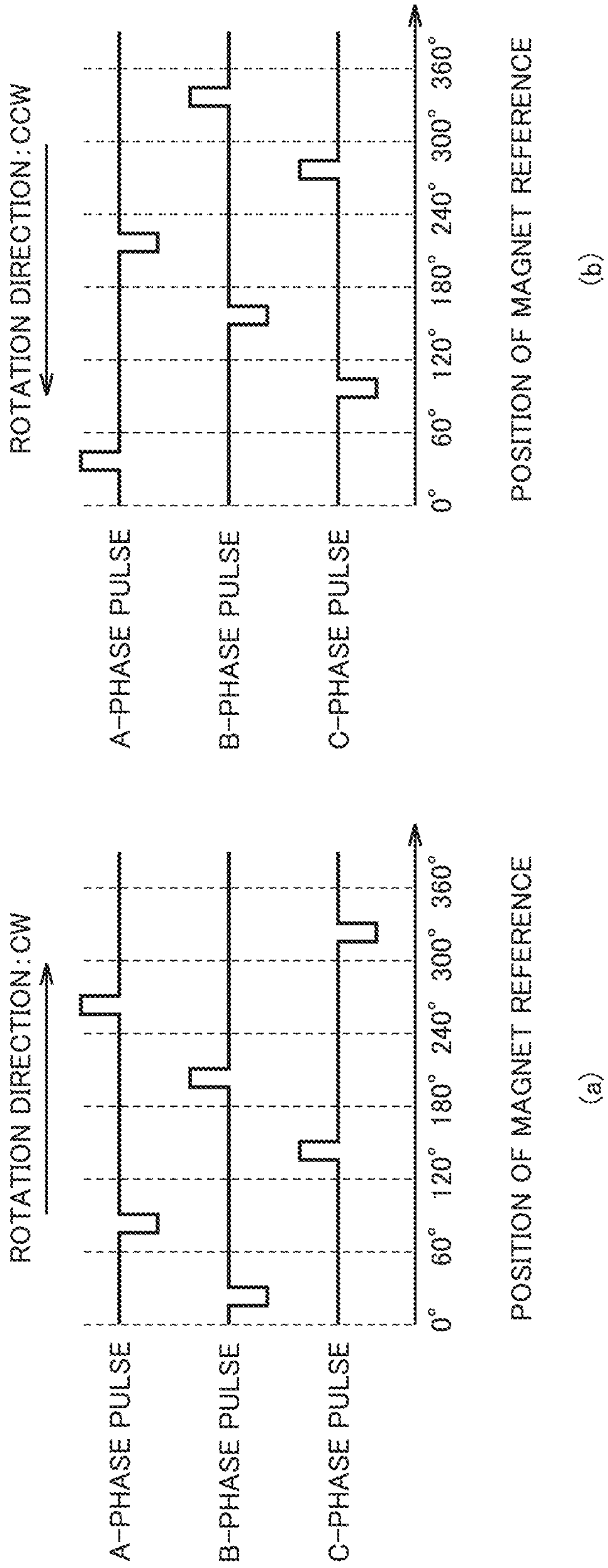
FIG. 5 shows waveform charts of voltage pulses generated from detection coils.

Referring back to FIG. 2, each of detection coils 112, 113, 114 arranged on the outer circumference of magnet 111 generates positive and negative voltage pulses according to the rotation of magnet 111 (rotation shaft 115). FIG. 5 shows waveform charts of voltage pulses generated from detection coils 112, 113, 114. FIG. 5(*a*) is a waveform chart of voltage pulses generated by detection coils 112, 113, 114 during rotation of magnet 111 in the CW direction. FIG. 5(*b*) is a waveform chart of voltage pulses generated by detection coils 112, 113, 114 during rotation of magnet 111 in the CCW direction. In each diagram, "A-phase pulse" indicates a voltage pulse of A-phase detection coil 112, "B-phase pulse" indicates a voltage pulse of B-phase detection coil 113, and "C-phase pulse" indicates a voltage pulse of C-phase detection coil 114.

FIG. 5(*a*) shows waveforms of the A-phase pulse, the B-phase pulse, and the C-phase pulse when magnet 111 rotates once in the CW direction, that is, when the position of the magnet reference changes from 0° (origin position) to 360°. In the example of FIG. 2, A-phase detection coil 112 is arranged at a position of 60°, B-phase detection coil 113 is arranged at the origin position (0°), and C-phase detection coil 114 is arranged at a position of 300°.

As described with reference to FIG. 4, each of detection coils 112, 113, 114 generates a positive or negative voltage pulse for each half cycle of the rotational cycle of magnet 111. However, the position at which each voltage pulse is generated is not the position at which its corresponding detection coil is arranged, but is a position displaced from such an arrangement position by an angle $\phi/2$. For example, the position at which the positive A-phase pulse is generated is displaced from the position of 60°, at which A-phase detection coil 112 is arranged, by $\phi/2$ in the CW direction. Also, the position at which a negative A-phase pulse is generated is displaced from the position of 240°, which is symmetrical to the position of 60° at which A-phase detection coil 112 is arranged, by $\phi/2$ in the CW direction. This is because, as shown in FIG. 3, magnetization M of the magnetic wire will not reverse if the external magnetic field, which has been reversed by magnet 111, does not reach a certain intensity (also referred to as a threshold below). When the rotation direction of magnet 111 is the CW direction as described above, the position at which each voltage pulse is generated is a position displaced in the CW direction from the position at which its corresponding detection coil is arranged.

FIG. 5(*b*) shows waveforms of the A-phase pulse, the B-phase pulse, and the C-phase pulse when magnet 111 rotates once in the CCW direction, that is, when the position of the magnet reference changes from 360° to 0° (origin position).

Also in FIG. 5(*b*), the position at which each of the A-phase pulse, the B-phase pulse, and the C-phase pulse is generated is not a position at which its corresponding detection coil is arranged, but is a position displaced from such an arrangement position by angle $\phi/2$, as in FIG. 5(*a*). However, when the rotation direction of magnet 111 is the CCW direction, the position at which the voltage pulse is generated is a position displaced in the CCW direction from the position at which its corresponding detection coil is arranged.

As described above, each of A-phase detection coil 112, B-phase detection coil 113, and C-phase detection coil 114 generates positive and negative voltage pulses according to the rotation of magnet 111. Rotation detection mechanism 110 sends a voltage pulse output from a detection coil of each phase to signal processing circuit 120. Signal processing circuit 120 generates a source voltage of signal processing circuit 120 with the use of electric power of the voltage pulse sent from rotation detection mechanism 110. Signal processing circuit 120 also detects the rotation direction and the number of rotations of rotation shaft 115 based on the voltage pulse.

Herein, in order to detect the number of rotations of rotation shaft 115, first, state signals indicating the states of A-phase detection coil 112, B-phase detection coil 113, and C-phase detection coil 114 need to be generated. The state signal of the detection coil of each phase can be generated based on a voltage pulse generated by the detection coil of each phase.

Specifically, the state signal of the detection coil of each phase can be generated so as to rise from the L (logically low) level to H (logically high) level upon generation of a positive voltage pulse and fall from H level to L level upon generation of a negative voltage pulse. In other words, the state signal of the detection coil of each phase is held at H level during a period between generation of a positive voltage pulse and generation of a negative voltage pulse by its corresponding detection coil and is held at L level during a period between generation of a negative voltage pulse and generation of a positive voltage. Thus, the state signal of the detection coil of each phase is a signal indicating the polarity of the last voltage pulse generated by its corresponding detection coil.

Figure 6:
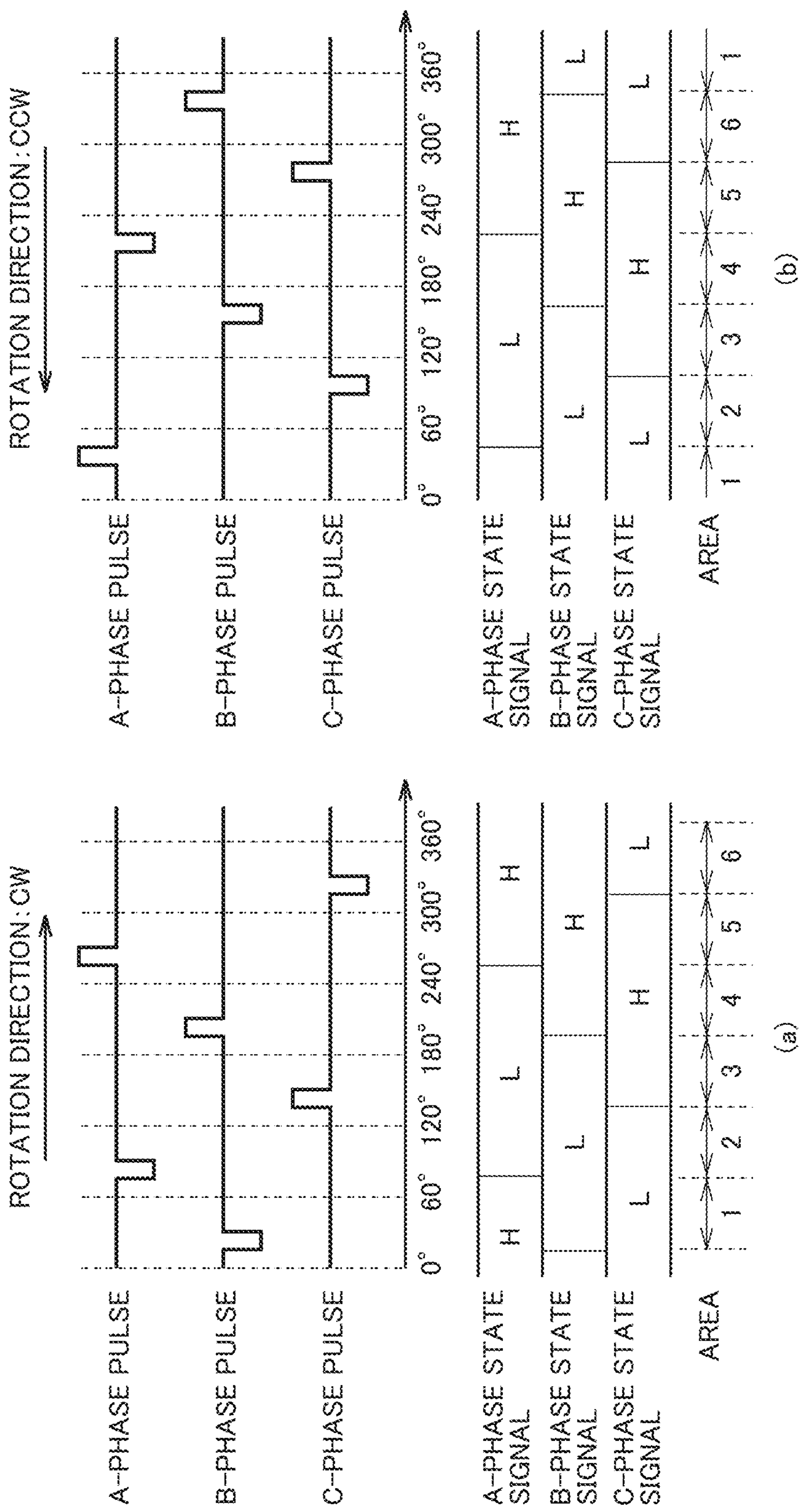
FIG. 6 shows changes in state signals of an A-phase detection coil, a B-phase detection coil, and a C-phase detection coil during rotation of a magnet.

FIG. 6 shows changes in the state signals of A-phase detection coil 112, B-phase detection coil 113, and C-phase detection coil 114 during rotation of magnet 111. FIG. 6(*a*) shows changes in the state signal of the detection coil of each phase during rotation of magnet 111 in the CW direction, and FIG. 6(*b*) shows changes in the state signal of the detection coil of each phase during rotation of magnet 111 in the CCW direction. As shown in FIGS. 6(*a*) and 6(*b*), any state signal changes alternately between H level and L level for each 180° (half cycle).

The case where the data on the number of rotations is changed in the vicinity of the "origin position" shown in FIG. 2 (i.e., the case where the number of rotations is counted) is considered here. Specifically, when magnet 111, which is located at the origin position (FIG. 2), rotates in the CW direction and passes through the origin position again, the number of rotations (count value) is increased by one (count-up). Also, when magnet 111, which is located at the origin position, rotates in the CCW direction and passes through the origin position again, the number of rotations (count value) is decreased by one (count-down).

In this case, it is determined from FIG. 6(*a*) that the magnet reference has passed through the origin position in the CW direction when it is detected that the state signal of A-phase detection coil 112 is at H level and that the state signal of B-phase detection coil 113 has fallen from H level to L level, and accordingly, the number of rotations is increased by one. It is determined from FIG. 6(*b*) that the magnet reference has passed through the origin position in the CCW direction when it is detected that the state signal of A-phase detection coil 112 is at H level and that the state signal of B-phase detection coil 113 has risen from L level to H level, and accordingly, the number of rotations is decreased by one.

Alternatively, a configuration can be made such that the number of rotations is increased by one when the state signal of C-phase detection coil 114 is at L level and a fall of the state signal of B-phase detection coil 113 is detected, and that the number of rotations is decreased by one when the state signal of C-phase detection coil 114 is at L level and a rise of the state signal of B-phase detection coil 113 is detected.

Alternatively, a configuration can be made such that the number of rotations is increased by one when the state signal of A-phase detection coil 112 is at H level, the state signal of C-phase detection coil 114 is at L level, and a fall of the state signal of B-phase detection coil 113 is detected, and that the number of rotations is decreased by one when the state signal of A-phase detection coil 112 is at H level, the state signal of C-phase detection coil 114 is at L level, and a rise of the state signal of B-phase detection coil 113 is detected.

Moreover, viewing the state signal of the detection coil of each phase enables estimation of an area where the magnet reference is located, that is, the rotational position of magnet 111. For example, it can be estimated that the magnet reference is located in area 1 when the state signal of A-phase detection coil 112 is at H level, the state signal of B-phase detection coil 113 is at L level, and the state signal of C-phase detection coil 114 is at L level. Consequently, when the magnet reference has moved from area 6 to area 1, magnet 111 is determined to have rotated once in the CW direction, and accordingly, the number of rotations can be increased by one. When the magnet reference has moved from area 1 to area 6, magnet 111 is determined to have rotated once in the CCW direction, and accordingly, the number of rotations can be decreased by one.

Configuration of Signal Processing Circuit

Next, a configuration and an operation of signal processing circuit 120 shown in FIG. 1 will be described.

Figure 7:
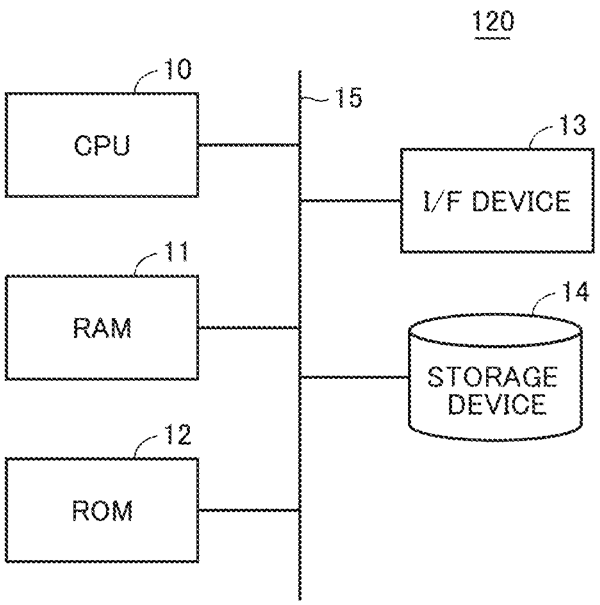
FIG. 7 shows a hardware configuration of a signal processing circuit.

FIG. 7 shows a hardware configuration of signal processing circuit 120. As shown in FIG. 7, signal processing circuit 120 includes a CPU (Central Processing Unit) 10, a RAM (Random Access Memory) 11, a ROM (Read Only Memory) 12, an I/F (Interface) device 13, and a storage device 14. CPU 10, RAM 11, ROM 12, I/F device 13, and storage device 14 exchange various types of data via a communication bus 15.

CPU 10 deploys the program stored in ROM 12 to RAM 11 for execution. The program stored in ROM 12 describes the processes performed by signal processing circuit 120.

I/F device 13 is an input/output device for exchanging signals and data with rotation detection mechanism 110 and an external device. I/F device 13 receives, from rotation detection mechanism 110, voltage pulses output from detection coils 112, 113, 114.

Storage device 14, which is a storage for storing various types of information, stores information on rotation detection mechanism 110, information on a rotating body, and the like. Storage device 14 also includes a non-volatile memory that can be updated, for storing information (e.g., the state of a detection coil, the number of rotations of rotation shaft 115) obtained from the voltage pulse received from rotation detection mechanism 110. The non-volatile memory will be described later in detail.

All or some of the functions implemented as CPU 10 executes the program may be implemented with a hard-wired circuit such as an integrated circuit. For example, they may be implemented with an ASIC (Application Specific Integrated Circuit), an FPGA (Field-Programmable Gate Array), a CPLD (Complex Programmable Logic Device), or the like.

Referring back to FIG. 1, the functional configuration of signal processing circuit 120 will be described. Signal processing circuit 120 includes full-wave rectifier circuits 121_A, 121_B, 121_C, a constant voltage circuit 122, an enable circuit 123, a pulse waveform code determination circuit 124, a controller 125, an adder 126, a non-volatile memory 127, an external circuit I/F 128, and a power switching circuit 129. At least controller 125 and adder 126 thereamong are implemented as CPU 10 (see FIG. 7) shown in FIG. 7 executes the program.

Signal processing circuit 120 performs a series of operations described below every time any of detection coils 112, 113, 114 outputs a voltage pulse in rotation detection mechanism 110.

Full-wave rectifier circuit 121_A is electrically connected to A-phase detection coil 112, performs full-wave rectification of a voltage pulse (A-phase pulse) output from A-phase detection coil 112, and outputs the rectified voltage pulse to constant voltage circuit 122.

Full-wave rectifier circuit 121_B is electrically connected to B-phase detection coil 113, performs full-wave rectification of a voltage pulse (B-phase pulse) output from B-phase detection coil 113, and outputs the rectified voltage pulse to constant voltage circuit 122.

Full-wave rectifier circuit 121_C is electrically connected to C-phase detection coil 114, performs full-wave rectification of a voltage pulse (C-phase pulse) output from C-phase detection coil 114, and outputs the rectified voltage pulse to constant voltage circuit 122.

Constant voltage circuit 122 generates a fixed voltage from the voltage pulse provided by any of full-wave rectifier circuits 121_A, 121_B, 121_C, and supplies the generated fixed voltage as a source voltage to enable circuit 123, pulse waveform code determination circuit 124, controller 125, adder 126, and non-volatile memory 127.

Power switching circuit 129 is configured so as to switch a supply source of electric power to controller 125 and non-volatile memory 127 between constant voltage circuit 122 and an external power supply (not shown) provided externally to rotation detector 101. The external power supply is a main power supply for driving a rotating body. Thus, electric power can be continuously supplied to controller 125 and non-volatile memory 127 also when rotation shaft 115 is stopped.

Non-volatile memory 127 stores the state of the detection coil of each phase and the number of rotations of rotation shaft 115 in generation of a voltage pulse, and the information on the detection coil (detection coil number) that has generated the voltage pulse. Every time any of detection coils 112, 113, 114 generates a voltage pulse, these pieces of information are obtained and are then stored in non-volatile memory 127. Non-volatile memory 127 further stores a conversion table (see FIGS. 8 and 9) described later.

For the state of the detection coil of each phase and the information on the detection coil that has generated a voltage pulse, non-volatile memory 127 is configured to hold at least the state of the detection coil of each phase in generation of the last voltage pulse and information on the detection coil that has generated the last voltage pulse, as well as the state of the detection coil of each phase in generation of the last but one voltage pulse and information on the detection coil that has output the last but one voltage pulse. These pieces of information are updated by controller 125 every time a voltage pulse is generated.

Upon confirmation that the voltage supplied from constant voltage circuit 122 has been stabled, enable circuit 123 transmits a trigger signal for starting an operation to pulse waveform code determination circuit 124, controller 125, adder 126, and non-volatile memory 127.

Pulse waveform code determination circuit 124 starts an operation upon receipt of the trigger signal from enable circuit 123. Pulse waveform code determination circuit 124 generates a detection signal of A-phase detection coil 112 based on the voltage pulse (A-phase pulse) output from A-phase detection coil 112, generates a detection signal of B-phase detection coil 113 based on the voltage pulse (B-phase pulse) output from B-phase detection coil 113, and generates a detection signal of C-phase detection coil 114 based on the voltage pulse (C-phase pulse) output from C-phase detection coil 114.

The detection signal of the detection coil of each phase is a signal indicating whether a voltage pulse has been generated from the detection coil of each phase, and the polarity of the generated voltage pulse. The detection signal is at H level when its corresponding detection coil generates a positive voltage pulse, is at L level when its corresponding detection coil generates a negative voltage pulse, and is zero when its corresponding detection coils generates no voltage pulse. In other words, the detection signal leaves the information on the voltage pulse generated by the detection coil of each phase as a history. Pulse waveform code determination circuit 124 transmits the generated detection signal to controller 125.

Controller 125 transmits, to adder 126, the detection signal of the detection coil of each phase received from pulse waveform code determination circuit 124. Controller 125 further accesses non-volatile memory 127 to read, from non-volatile memory 127, the number of rotations of rotation shaft 115 in generation of the last voltage pulse, the state of the detection coil of each phase in generation of the last voltage pulse and the information on the detection coil that has generated the last voltage pulse, and the state of the detection coil of each phase in generation of the last but one voltage pulse and the information on the detection coil that has output the last but one voltage pulse. Controller 125 transmits these pieces of read information to adder 126.

Based on the information received from controller 125 (the state signal of the detection coil of each phase in generation of a current voltage pulse and the information read from non-volatile memory 127), adder 126 updates the state of the detection coil of each phase and the number of rotations to the latest state of the detection coil of each phase and the latest number of rotations, respectively, using the conversion table (FIGS. 8 and 9) described later. Adder 126 transmits the updated latest state of the detection coil of each phase and the updated latest number of rotations to controller 125.

Upon receipt of the information from adder 126, controller 125 accesses non-volatile memory 127 again and writes, into non-volatile memory 127, the latest state of the detection coil of each phase and the latest number of rotations, and the information on the detection coil that has generated the current voltage pulse.

Every time any of detection coils 112, 113, 114 outputs a voltage pulse, signal processing circuit 120 can detect the number of rotations of rotation shaft 115 in a battery-less manner by performing the series of operations described above using the source voltage generated from this voltage pulse.

When the number of rotations of rotation shaft 115 is read from outside of rotation detector 101, the number of rotations can be read as non-volatile memory 127 is accessed via external circuit I/F 128 and controller 125. At this time, controller 125 is configured to limit access to non-volatile memory 127 from outside so as to prevent a conflict between the series of operations for updating the number of rotations described above and the operation of reading the number of rotations from outside.

When accessing non-volatile memory 127 from outside, power switching circuit 129 supplies a source voltage from the external power supply (main power supply) to controller 125 and non-volatile memory 127. Further, power switching circuit 129 supplies a source voltage to external circuit I/F 128 directly from the external power supply. Thus, the number of rotations can be read without depending on the electric power of the voltage pulse.

When electric power is supplied from the external power supply, thus, a conflict with access to non-volatile memory 127 can be avoided by a configuration that invokes information stored in non-volatile memory 127 to a register (not shown) built in signal processing circuit 120, and upon detection of completion of power supply, stores the information from the register in non-volatile memory 127.

Update Process

As described above, adder 126 performs the process of updating the state of the detection coil of each phase and the number of rotations of rotation shaft 115 that are stored in non-volatile memory 127, based on the voltage pulse output from each of detection coils 112, 113, 114 according to the rotation of magnet 111. However, adder 126 is configured to perform, in the event of a phenomenon where a voltage pulse drops out (also referred to as a "pulse dropout") in at least one detection coil during rotation of magnet 111, a correction process for compensating for the dropped voltage pulse in the update process. The update process including such correction is performed according to the conversion table shown in FIGS. 8 and 9.

The conversion table shown in FIGS. 8 and 9 indicates transitions, which are associated with the rotation of magnet

111, of the state of the detection coil of each phase and the area where the magnet reference is located. In this conversion table, the "current status" represents the state of the detection coil of each phase from the generation of the last voltage pulse to the generation of the current voltage pulse, and the area where the magnet reference is located, estimated from the state of the detection coil of each phase.

The "last status" represents the state of the detection coil of each phase from the generation of the last but one voltage pulse to the generation of the last voltage pulse, and the area where the magnet reference is located, estimated from the state of the detection coil of each phase. Each of the current status and the last status is updated upon generation of the current voltage pulse.

In the conversion table, "before update" means before update of the state by the current voltage pulse, and "after update" means after update of the state by the current voltage pulse. The information before update includes "the current status" and the "last status", as well as the information on the detection coil (represented as "the last but one detection coil number") that has generated the last but one voltage pulse.

The information after update includes the "current status" and the "last status", as well as an amount of correction (referred to as "count") of a count value of the number of rotations of rotation shaft 115. The value "0" means that the number of rotations is not corrected, the value "1" means that the number of rotations is increased by "1", and the value "−1" means that the number of rotations is decreased by 1.

The conversion table further shows the detection signal (referred to as "power generation element input") of each of detection coils 112, 113, 114. This detection signal is a signal generated in pulse waveform code determination circuit 124 (FIG. 1) described above. "H" means that the detection coil has generated a positive voltage pulse, "L" means that the detection coil has generated a negative voltage pulse, and "0" means that the detection coil has generated no voltage pulse. When the detection signal is held in non-volatile memory 127, the information may be compressed by encoding a detection signal in place of "0", "H", and "L".

When a state transition not shown in the conversion table appears, signal processing circuit 120 determines that a phenomenon different from an assumed pulse dropout has occurred, and outputs an error.

The update process including the correction process performed by adder 126 will now be described.

Herein, "pulse dropouts" include a pulse dropout that occurs at a timing immediately after the reverse of the rotation direction of magnet 111 and a pulse dropout that occurs at any timing other than the above timing. Adder 126 performs the correction process on each of the two types of pulse dropouts.

First, description will be given with regard to the correction process performed on a pulse dropout that occurs at a timing immediately after the reverse of the rotation direction of rotation shaft 115.

When the rotation direction of magnet 111 reverses immediately after the generation of a voltage pulse from the detection coil, a magnetic field of the polarity opposite to that of the magnetic field that has generated the voltage pulse due to the reverse of magnet 111 is applied to the detection coil. Even when the intensity of the magnetic field applied exceeds a threshold, a phenomenon where the voltage level of the voltage pulse generated from the detection coil decreases may occur. When the voltage level of the voltage pulse decreases drastically, signal processing circuit 120 fails to operate upon receipt of the electric power of the voltage pulse, leading to the occurrence of a pulse dropout. This results in a phenomenon where the actual position of the magnet reference does not match the position of the magnet reference which is estimated from the state of the detection coil of each phase, which is held in non-volatile memory 127.

Assumed here as a "first example" is a case where B-phase detection coil 113 is arranged at the origin position, the magnet reference, which is located at the origin position (see FIG. 2), moves in the CW direction from area 6 to area 1, and the intensity of the magnetic field applied to B-phase detection coil 112 exceeds a threshold. Consequently, a voltage pulse is generated from B-phase detection coil 112. Then, it is assumed that the magnet reference returns from area 1 to area 6 as the rotation of magnet 111 reverses in the CCW direction immediately after the generation of a voltage pulse.

At this time, in rotation detector 101, as magnet 111 rotates in the CCW direction, the intensity of the magnetic field of reverse polarity applied to B-phase detection coil 113 exceeds a threshold. However, signal processing circuit 120 does not operate due to a low voltage level of the voltage pulse generated by B-phase detection coil 113, and accordingly, a "pulse dropout" occurs. As a result, controller 125 holds the state of the detection coil of each phase which indicates that the magnet reference is located in area 1, without updating the state of the detection coil of each phase and the position of the magnet reference, which are held in non-volatile memory 127.

As magnet 111 further continuously rotates in the CCW direction, the intensity of the magnetic field applied to C-phase detection coil 114 exceeds a threshold, and accordingly, C-phase detection coil 114 generates a voltage pulse. However, non-volatile memory 127 holds the state of the detection coil of each phase at the time when the magnet reference is located in area 1, as described above. Contrastingly, it is only B-phase detection coil 113 or A-phase detection coil 112, not C-phase detection coil 114, that generates a voltage pulse when the magnet reference moves from area 1 to area 6 or area 2, and thus, adder 126 can detect the occurrence of a pulse dropout.

As in the first example, the situation where C-phase detection coil 114 generates a voltage pulse when the state of the detection coil of each phase is held with the magnet reference being located in area 1 may occur also when the magnet reference moves in the CCW direction from area 2 to area 1, and immediately after that, the rotation direction of magnet 111 reverses. This case is referred to as a "second example".

In the second example, a pulse dropout of A-phase detection coil 112 occurs when the magnet reference returns from area 1 to area 2, and when the magnet reference moves to area 3 as magnet 111 further continuously rotates in the CW direction, C-phase detection coil 114 generates a voltage pulse. Also in the second example, as in the first example, since the magnet reference, which is located in area 1, does not move to the area where C-phase detection coil 114 generates a voltage pulse, adder 126 can detect the occurrence of a pulse dropout.

Herein, the position of the magnet reference which is estimated from the state of the detection coil of each phase in generation of the last voltage pulse is area 1 both in the first example and the second example, and accordingly, the first example and the second example cannot be distinguished from each other. Thus, the position of the magnet reference and the number of rotations cannot be corrected even though a pulse dropout can be detected.

In contrast, the position of the magnet reference, held in non-volatile memory 127, which is estimated from the state of the detection coil of each phase in generation of the last but one voltage pulse is different in both the cases, that is, it is area 6 in the first example, whereas it is area 2 in the second example. Accordingly, the first example and the second example can be distinguished from each other. Specifically, it is estimated in the first example that a pulse dropout occurs when the magnet reference moves from area 1 to area 6, and then, C-phase detection coil 114 generates a voltage pulse when the magnet reference moves from area 6 to area 5. Thus, the state (current status) of the detection coil of each phase in generation of the last voltage pulse, which is held in non-volatile memory 127, can be corrected to the state of the detection coil of each phase when the magnet reference is located in area 5 with one area skipped in the CCW direction from area 1, and also, a correction to decrease the number of rotations by one can be made. In the conversion table of FIG. 8, this correction process is indicated by the "first example".

Also in the second example, as in the first example, the state (current status) of the detection coil of each phase and the number of rotations in generation of the last voltage, which are held in non-volatile memory 127, can be corrected. Specifically, it can be estimated in the second example that a pulse dropout has occurred during moving of the magnet reference from area 1 to area 2, and then, C-phase detection coil 114 has generated a voltage pulse during moving of the magnet reference from area 2 to area 3. Thus, the state (current status) of the detection coil of each phase in generation of the last voltage pulse, which is held in non-volatile memory 127, can be corrected to the state of the detection coil of each phase when the magnet reference is located in area 3 with one area skipped in the CW direction from area 1. In the second example, however, the number of rotations is not corrected. In the conversion table of FIG. 8, this correction process is shown by the "second example".

As described above, the transition of the position of the magnet reference can be estimated by referring to the state of the detection coil of each phase in generation of the last voltage pulse, the state of the detection coil of each phase in generation of the last but one voltage pulse, and the current voltage pulse (polarity and detection coil). Consequently, the state of the detection coil of each phase and the number of rotations, which are held in non-volatile memory 127, can be corrected.

The correction process performed for a pulse dropout that occurs at any timing other than immediately after the reverse of the rotation direction of rotation shaft 115 will be described with reference to FIG. 10.

Unlike the first example and the second example described above, the following case is conceivable: also in the situation where the rotation direction of coil magnet 111 does not reverse immediately after the generation of a voltage pulse by the detection coil and magnet 111 continuously rotates, or the situation where a pulse dropout occurs immediately after the reverse of the rotation direction of magnet 111 and magnet 111 continuously rotates, the voltage level of the voltage pulse may decrease due to the quality problem with a power generation component and a detection component or the influence of noise, and accordingly, a pulse dropout may occur. Also in this case, since signal processing circuit 120 fails to operate upon receipt of electric power of a voltage pulse, a pulse dropout occurs. This may lead to a phenomenon where the actual position of the magnet reference does not match the position of the magnet reference which is estimated from the state of the detection coil of each phase, which is held in non-volatile memory 127.

Figure 10:
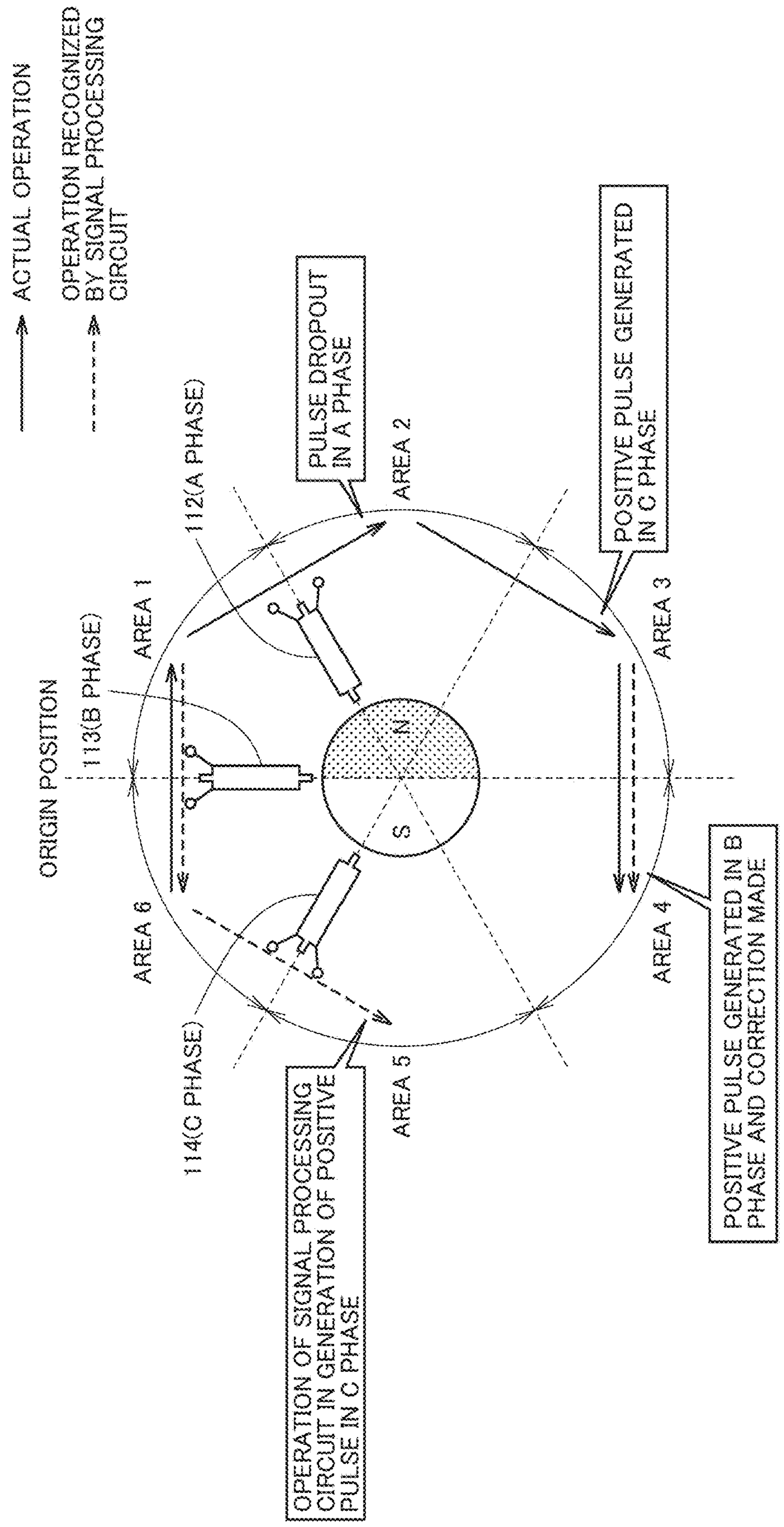
FIG. 10 is a diagram for describing an example pulse dropout occurrence pattern.

Assumed here as a "third example" is a case where B-phase detection coil 113 is arranged at the origin position, and the magnet reference, which is located at the origin position, moves in the CW direction from area 6 in order of area 1, area 2, area 3, and area 4, as shown in FIG. 10. The solid arrows in the figure indicate the actual rotation of magnet 111, and the dashed arrows indicate the rotation of magnet 111 which is recognized by signal processing circuit 120.

First, when the magnet reference moves in the CW direction from area 6 to area 1, a negative voltage pulse is generated from B-phase detection coil 113. Along with this, adder 126 increases the number of rotations by one.

Subsequently, it is assumed that even when the intensity of the magnetic field exceeds a threshold in A-phase detection coil 112 as the magnet reference moves from area 1 to area 2, no voltage pulse has been generated due to a quality problem, noise, or the like.

When the magnet reference further moves from area 2 to area 3, C-phase detection coil 114 generates a positive voltage pulse.

The generation pattern of the series of voltage pulses is the same as the generation pattern of voltage pulses in the first example described above. Thus, as in the first example, adder 126 estimates that a pulse dropout has occurred immediately after the reverse of the rotation direction of rotation shaft 115 to the CCW direction, corrects the state (current status) of the detection coil of each phase in generation of the last voltage pulse, which is held in non-volatile memory 127, to the state of the detection coil of each phase when the magnet reference is located in area 5, and corrects the state (last status) of the detection coil of each phase in generation of the last but one voltage pulse to the state of the detection coil of each phase when the magnet reference is located in area 6. Further, adder 126 makes a correction to decrease the number of rotations by one. As is apparent from FIG. 10, however, the estimation and correction are different from those of the actual rotation of magnet 111.

Subsequently, when the magnet reference moves in the CW direction from area 3 to area 4, B-phase detection coil 113 generates a positive voltage pulse. This generation pattern of the voltage pulse is a pattern that would not normally occur when the magnet reference is located in area 5. Also, this generation pattern is a pattern that cannot occur also when a pulse dropout occurs in the CW direction and when a pulse dropout occurs after a pulse dropout that has occurred immediately after the reverse to the CCW direction.

Then, adder 126 refers to the history of the information on the detection coil (detection coil number) that has generated the last voltage pulse and the last but one voltage pulse, in addition to the state of the detection coil of each phase in generation of the last voltage pulse and the state of the detection coil of each phase in generation of the last but one voltage pulse, which are held in non-volatile memory 127.

Specifically, it is estimated that when the last but one voltage pulse has been generated from B-phase detection coil 113 and the last voltage pulse has been generated from C-phase detection coil 114, adder 126 estimates that magnet 111 has rotated in the CW direction and a pulse dropout has occurred in generation of the last voltage pulse. Then, adder

126 estimates that the position of the magnet reference in generation of the last but one voltage pulse is not area 5 but is area 3, and also updates the position of the magnet reference in generation of the last voltage pulse to area 4. Specifically, adder 126 corrects the state (current status) of the detection coil of each phase in generation of the last voltage pulse, which is held in non-volatile memory 127, to the state of the detection coil of each phase when the magnet reference is located in area 4, and also corrects the state (last status) of the detection coil of each phase in generation of the last but one voltage pulse to the state of the detection coil of each phase when the magnet reference is located in area 3. Further, adder 126 makes a correction to increase the number of rotations by one and stores the corrected number of rotations in non-volatile memory 127. In the conversion table of FIG. 9, this correction process is indicated by the "third example".

In the pattern described above, if the last but one voltage pulse has been generated from other than B-phase detection coil 113, it is found that a motion is not an estimated one, and accordingly, adder 126 does not make a correction and outputs an error.

Next, assumed as a "fourth example" is a case where a pulse dropout has occurred immediately after the reverse of the rotation direction of magnet 111, and successively, a pulse dropout has occurred. For example, the following case is assumed where B-phase detection coil 113 is arranged at the origin position, and the magnet reference, which is located at the origin position, moves in the CW direction from area 6 to area 1, and then, the magnet reference moves in the CCW direction in order of area 6, area 5, and area 4 due to the reverse of the rotation direction.

First, when the magnet reference moves in the CW direction from area 6 to area 1, a negative voltage pulse is generated from B-phase detection coil 113. Along with this, adder 126 increases the number of rotations by one.

Subsequently, when a pulse dropout occurs in B-phase detection coil 113 as the rotation direction of magnet 111 reverses and the magnet reference returns in the CCW direction from area 1 to area 6, non-volatile memory 127 holds the state of the detection coil of each phase when the magnet reference is located in area 1.

Subsequently, it is assumed that even when the intensity of the magnetic field exceeds a threshold in C-phase detection coil 114 as the magnet reference moves in the CCW direction from area 6 to area 5, a voltage pulse has not occurred due to a quality problem, noise, or the like.

Further, when the magnet reference moves in the CCW direction from area 5 to area 4, A-phase detection coil 112 generates a negative voltage pulse. This generation pattern of the voltage pulse is the same as the generation pattern when the magnet reference moves in the CW direction from area 1 to area 2. Thus, adder 126 estimates that the magnet reference is located in area 2 and holds, as the current status, the state of the detection coil of each phase when the magnet reference is located in area 2 in non-volatile memory 127.

Subsequently, when the magnet reference moves in the CCW direction from area 4 to area 3, B-phase detection coil 113 generates a negative voltage pulse. This generation pattern of the voltage pulse is a pattern that would not normally occur when the magnet reference is located in area 2. Then, adder 126 refers to the history of the detection coil (detection coil number) that has generated the last voltage pulse and the last but one voltage pulse, in addition to the state of the detection coil of each phase in generation of the last voltage pulse and the state of the detection coil of each phase in generation of the last but one voltage pulse, which are held in non-volatile memory 127.

Specifically, when the last but one voltage pulse has been generated from B-phase detection coil 113, adder 126 estimates that magnet 111 has actually rotated in the CCW direction and a pulse dropout has occurred in generation of the last voltage pulse. In this case, adder 126 estimates that the position of the magnet reference in generation of the last but one voltage pulse is not area 2 but is area 4, and also updates the position of the magnet reference in generation of the last voltage pulse to area 3. Specifically, adder 126 corrects the state (current status) of the detection coil of each phase in generation of the last voltage pulse, which is held in non-volatile memory 127 to the state of the detection coil of each phase when the magnet reference is located in area 3 and corrects the state (last status) of the detection coil of each phase in generation of the last but one voltage pulse to the state of the detection coil of each phase when the magnet reference is located in area 4. Further, adder 126 makes a correction to decrease the number of rotations by one and stores the corrected number of rotations in non-volatile memory 127. In the conversion table of FIG. 8, this correction process is indicated by the "fourth example".

When a voltage pulse is generated from the same detection coil as the detection coil (detection coil number) that has generated the last voltage pulse and also the polarity of the voltage pulse is the same in these detection coils, the area where the magnet reference after update is located is the same as the area where the magnet reference before update is located. In this case, controller 125 updates the history of the information on the detection coil (detection coil number) that has generated a voltage pulse, and for other information, writes the information read from non-volatile memory 127 without any change into non-volatile memory 127. This is because as the history of the information on the detection coil (detection coil number) is updated, the information on the detection coil that has detected the last but one voltage pulse, which is referred to in correction, is updated, and accordingly, even a pattern in which a correction can be made does not match the conversion pattern shown in the conversion table (see FIGS. 8 and 9), and an error is output.

Also, during a period from immediately after the occurrence of a pulse dropout to the actual execution of a correction, the area where the magnet reference is actually located is different from the area where the magnet reference in the current status is located, which is held in non-volatile memory 127. Thus, as the number of rotations is read during this period, the read number of rotations may not match the actual number of rotations.

However, since the number of rotations is read with electric power being supplied from the external power supply, the position of the magnet reference can be checked correctly by another means (e.g., optical, mechanical, or magnetic encoder) using the external power supply. Consequently, reading of the number of rotations before correction can be prevented by a configuration that compares the area where the magnet reference is located with the area where the magnet reference is located, which is stored in non-volatile memory 127, and outputs an error when these areas do match each other. When determining a mismatch, it is desirable to determine whether not only the current area where the magnet reference is located but also the last area where the magnet reference has been located matches while also taking into account the case where a pulse dropout has occurred due to the reverse of the rotation direction. It is further desirable to determine whether the phase in generation of voltage pulse matches, while taking into account the hysteresis characteristics of the detection coil (see FIG. 3).

If the situation where a pulse dropout occurs twice consecutively without reverse of the rotation direction of magnet 111 and the situation where a pulse dropout occurs three times consecutively after the reverse of the rotation direction of magnet 111, which are extremely limited, occur, the detection coil that has generated the last voltage pulse and the detection coil that has generated the current voltage pulse are considered to be the same. In contrast, the area where the magnet reference is actually located has moved to the area symmetrical to the area where the magnet reference is located, which is estimated from the state of the detection coil of each phase in generation of a voltage pulse. Thus, the voltage pulse generated upon movement of the magnet reference thereafter has the opposite polarity to that of the voltage pulse generated by estimated movement of the magnet reference. In this case, with reference to the information on the detection coil (detection coil number) that has generated the last but one voltage pulse, a conversion pattern does not correspond to any conversion pattern shown in the conversion table of FIGS. 8 and 9, and accordingly, an error is output. Thus, the area where the magnet reference is located is not corrected to the area different from the area where the magnet reference is actually located. Consequently, a false detection of the number of rotations which is associated with a false correction can be avoided, thus preventing an overrun in which rotation shaft 115 overruns a stop position and a serious accident such as misalignment of rotation shaft 115.

The area where the magnet reference is located in generation of the last voltage pulse can be determined uniquely by including the information regarding in which direction of the CW direction and the CCW direction the magnet reference has moved to a current position. Thus, the use of the information indicating the direction of movement of the magnet reference can reduce the amount of information stored in non-volatile memory 127.

Further, the information on the detection coil that has generated the last but one voltage pulse can be obtained from the difference between the last area where the magnet reference has been located and the last but one area where the magnet reference has been located, and accordingly, information on this difference may be used.

Even when a reverse pulse is detected, controller 125 does not update information of non-volatile memory 127 and can handle the information as when a reverse pulse dropout occurs in the process for the voltage pulse which will be generated next.

As described above, the rotation detector according to Embodiment 1 can detect not only a pulse dropout that occurs at a timing immediately after the reverse of the rotation direction of magnet 111 but also a pulse dropout that occurs at any timing other than the above timing by referring to the current voltage pulse (polarity and detection coil), as well as the state of the detection coil of each phase in generation of the last voltage pulse, the state of the detection coil of each phase in generation of the last but one voltage pulse, and the history of the information on the detection coil (detection coil number) that has generated the last voltage pulse and the last but one voltage pulse, which are held in non-volatile memory 127. Then, for any pulse dropout, the state of the detection coil (the position of the magnet reference) of each phase and the number of rotations of rotation shaft 115, which are held in non-volatile memory 127, can be corrected using the information. Consequently, the accuracy of correcting the number of rotations for a pulse dropout can be increased.

Embodiment 2

Figure 11:
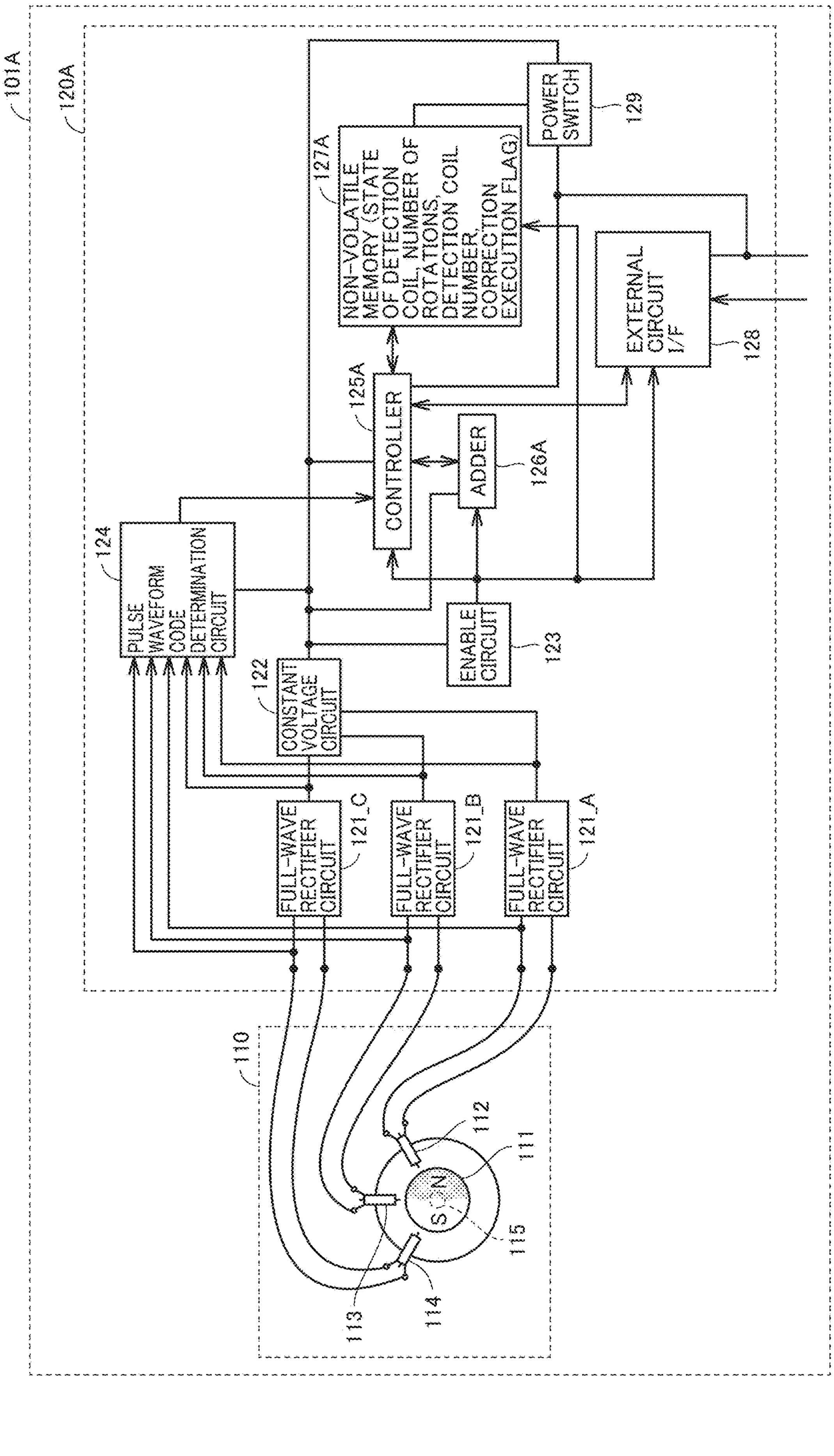
FIG. 11 shows an overall configuration of a rotation detector according to Embodiment 2.

FIG. 11 shows an overall configuration of a rotation detector according to Embodiment 2. As shown in FIG. 11, a rotation detector 101A according to Embodiment 2 is different from rotation detector 101 shown in FIG. 1 in that it includes a signal processing circuit 120A in place of signal processing circuit 120.

Signal processing circuit 120A includes a controller 125A, an adder 126A, and a non-volatile memory 127A in place of controller 125, adder 126, and non-volatile memory 127 in signal processing circuit 120 shown in FIG. 1, respectively.

Non-volatile memory 127A is configured to store a "correction execution flag" indicating that a correction has been made in the last update process, in addition to the number of rotations of rotation shaft 115, the state of the detection coil of each phase in generation of a voltage pulse, and the history of the information on the detection coil (detection coil number) that has generated a voltage pulse. Non-volatile memory 127A further stores a conversion table shown in FIGS. 12 and 13.

The correction execution flag is added to the updated information in the conversion table shown in FIGS. 12 and 13. The correction execution flag is set to "1" when a correction has been made in the last update process and is set to "0" when no correction has been made.

Controller 125A accesses non-volatile memory 127A and reads, from non-volatile memory 127A, the number of rotations of rotation shaft 115 in generation of the last voltage pulse, the state of the detection coil of each phase in generation of the last voltage pulse and the information on the detection coil that has output the last voltage pulse, the state of the detection coil of each phase in generation of the last but one voltage pulse and the information on the detection coil that has output the last but one voltage pulse, and the correction execution flag. Controller 125 transmits such pieces of read information to adder 126A.

Adder 126A performs the update process using the conversion table (see FIGS. 12 and 13) based on the pieces of information received from controller 125A (the information on the current voltage pulse and the information read from non-volatile memory 127A). In this update process, adder 126A sets the correction execution flag at 1 when it has performed a process of correcting the state of the detection coil of each phase (the position of the magnet reference), which is held in non-volatile memory 127A. Adder 126A also outputs an error when the correction execution flag read from non-volatile memory 127A is set at 1 in the update process and when such an update process as to correct the position of the magnet reference has been performed.

Controller 125A accesses non-volatile memory 127A again and writes, into non-volatile memory 127A, the information received from adder 126A and the history of the updated information on the detection coil.

Embodiment 2 is configured so as to output an error when a pattern to make a correction also in the following update process occurs with the correction execution flag set at 1. As a result, the operation of the device can no longer be continued, but false reading of the number of rotations can be avoided. The update process according to Embodiment 2 will be described below.

Assumed here as a “fifth example” is a case where B-phase detection coil 113 is arranged at the origin position, the magnet reference, which is located in area 5, moves in the CW direction from area 5 to area 6, area 1, and area 2 in order, and then, the rotation direction of magnet 111 reverses, so that the magnet reference moves in the CCW direction from area 2 to area 1.

At first, when the magnet reference moves in the CW direction from area 5 to area 6, C-phase detection coil 114 generates a negative voltage pulse. In addition, when the magnet reference moves in the CW direction from area 6 to area 1, B-phase detection coil 113 generates a negative voltage pulse. Along with this, adder 126A increases the number of rotations by one.

It is then assumed that the magnet reference moves in the CW direction from area 1 to area 2, and a pulse dropout occurs in which the voltage pulse of A-phase detection coil 112 is not generated due to a quality problem, noise, or the like. Due to this pulse dropout, non-volatile memory 127A holds the state of the detection coil of each phase when the magnet reference is located in area 1.

Subsequently, when the rotation direction of magnet 111 reverses to the CCW direction and the magnet reference returns from area 2 to area 1, A-phase detection coil 112 generates a positive voltage pulse. This generation pattern of the voltage pulse is a pattern that would not normally occur when the magnet reference is located in area 1. Thus, adder 126A makes a correction using the information indicating that the last but one voltage pulse has been generated by C-phase detection coil 114 according to the conversion table of FIGS. 12 and 13. At this time, adder 126A sets the correction execution flag at 1.

In this case, adder 126A estimates that the position of the magnet reference in generation of the last but one voltage pulse is not area 1 but is area 4, and also updates the position of the magnet reference in generation of the last voltage pulse to area 5. Specifically, adder 126A corrects the state (current status) of the detection coil of each phase in generation of the last voltage pulse, which is held in non-volatile memory 127A, to the state of the detection coil of each phase when the magnet reference is located in area 5, and also corrects the state (last status) of the detection coil of each phase in generation of the last but one voltage pulse to the state of the detection coil of each phase when the magnet reference is located in area 4. Further, adder 126A makes a correction to decrease the number of rotations by one and stores the corrected number of rotations in non-volatile memory 127A together with the correction execution flag (=1). Note that this process is not a process of correcting to the actual position of the magnet reference, and accordingly, is a false correction.

Subsequently, when the magnet reference moves further in the CCW direction and the magnet reference moves from area 1 to area 6, B-phase detection coil 113 generates a positive voltage pulse. This generation pattern of the voltage pulse is a pattern that would not normally occur when the magnet reference is located in area 5. According to the conversion table of FIGS. 12 and 13, the magnet reference is estimated to be located not in area 5 but in area 1, and the updated area is moved to area 6, and also, the number of rotations is decreased by one. The position of the magnet reference finally returns to the actual position by two correction processes described above, but the number of rotations is one short of the actual number of rotations.

In Embodiment 2, thus, an error is output when the update process is performed with the correction execution flag set at 1 and when a further correction is made subsequently. As a result, the operation of the device can no longer be continued, but false reading of the number of rotations can be avoided.

As described above, the rotation detector according to Embodiment 2 can avoid a false detection of the number of rotations, which occurs when a pulse dropout of a detection coil and multiple reverse operations in the rotation direction are combined, by referring to the correction execution flag. This can eliminate restrictions on the rotation direction of rotation shaft 115.

Embodiment 3

Figure 14:
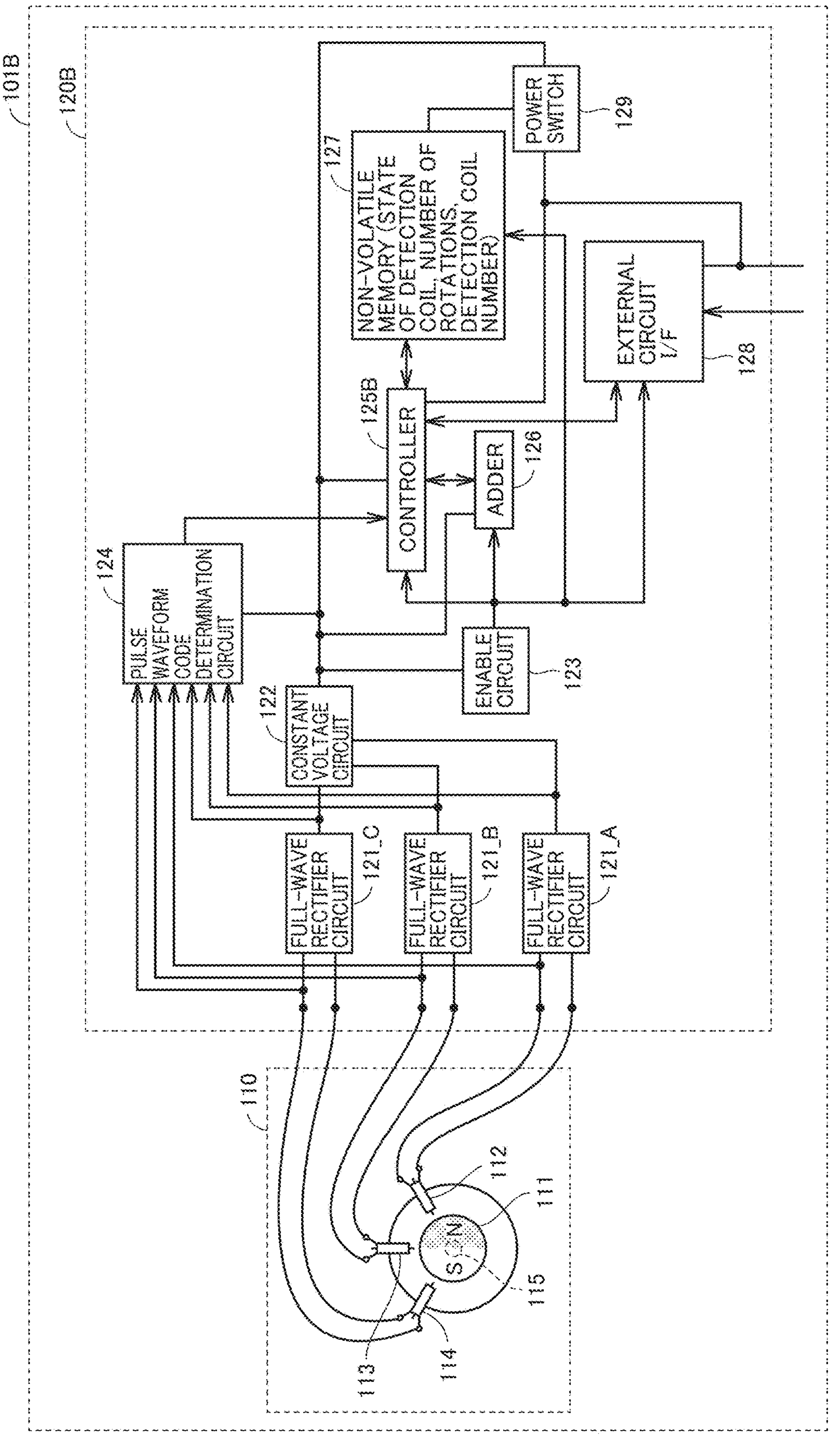
FIG. 14 shows an overall configuration of a rotation detector according to Embodiment 3.

FIG. 14 shows an overall configuration of a rotation detector according to Embodiment 3. As shown in FIG. 14, a rotation detector 101B according to Embodiment 3 is different from rotation detector 101 shown in FIG. 1 in that it includes a signal processing circuit 120B in place of signal processing circuit 120.

Signal processing circuit 120B includes a controller 125B in place of controller 125 in signal processing circuit 120 shown in FIG. 1.

Controller 125B accesses non-volatile memory 127 and reads, from non-volatile memory 127, the number of rotations of rotation shaft 115 in generation of the last voltage pulse, the state of the detection coil of each phase in generation of the last voltage pulse and the information on the detection coil (detection coil number) that has output the last voltage pulse, and the state of the detection coil of each phase in generation of the last but one voltage pulse and the information on the detection coil (detection coil number) that has output the last but one voltage pulse. Controller 125B transmits these pieces of read information to adder 126.

After the execution of the update process by adder 126, controller 125B accesses non-volatile memory 127 again and writes, into non-volatile memory 127, the information from adder 126 and the updated information on the detection coil.

At this time, controller 125B determines whether the information on the detection coil that has generated the last voltage pulse is the same as the information on the detection coil that has generated the current voltage pulse. When these two pieces of information are the same, controller 125B writes the information read from non-volatile memory 127 without any change, without updating the information held in non-volatile memory 127. Alternatively, when non-volatile memory 127 is non-destructive read memory, controller 125B holds the last value without performing writing. In contrast, when these two pieces of information are different, controller 125B performs a normal update process and writes the state of the detection coil of each phase, the number of rotations, and the information on the detection coil into non-volatile memory 127.

Embodiment 3 can also perform a correction in a pattern in which a correction cannot be made in Embodiments 1 and 2 described above, and continue an operation of rotation detector 101B. The update process according to Embodiment 3 will be described below.

Assumed here as a “sixth example” is a case where B-phase detection coil 113 is arranged at the origin position, the magnet reference, which is located at the origin position, moves in the CW direction from area 6 to area 1, area 2, and area 3 in order, and then, the rotation direction of magnet 111 reverses, so that the magnet reference moves in the CCW direction from area 3 to area 2 and area 1 in order.

At first, B-phase detection coil 113 generates a negative voltage pulse when the magnet reference moves in the CW direction from area 6 to area 1. Along with this, adder 126 increases the number of rotations by one.

Subsequently, it is assumed that the magnet reference moves in the CW direction from area 1 to area 2, and a pulse dropout occurs in which the voltage pulse of A-phase detection coil 112 is not generated due to quality, noise, or the like. Due to this pulse dropout, non-volatile memory 127 holds the state of the detection coil of each phase when the magnet reference is located in area 1.

Subsequently, when the magnet reference moves in the CW direction from area 2 to area 3, C-phase detection coil 114 generates a positive voltage pulse. This generation pattern of the voltage pulse is the same as the generation pattern in the "first example" described in Embodiment 1. Thus, adder 126 estimates that a pulse dropout has occurred immediately after the reverse of the rotation direction, and corrects the state (current status) of the detection coil of each phase in generation of the last voltage pulse to the state of the detection coil of each phase when the magnet reference is located in area 5 and also corrects the state (last status) of the detection coil of each phase in generation of the last but one voltage pulse to the state of the detection coil of each phase when the magnet reference is located in area 6. Further, adder 126 decreases the number of rotations by one.

Subsequently, when the rotation direction of magnet 111 reverses to the CCW direction and the magnet reference returns from area 3 to area 2, C-phase detection coil 114 generates a negative voltage pulse. At this time, the detection coil that has generated the last voltage pulse and the detection coil that has generated the current voltage pulse are the same C-phase detection coil 114, and accordingly, adder 126 does not update the area of the magnet reference and the information on the detection coil.

Subsequently, when magnet 111 rotates in the CCW direction and the magnet reference moves from area 2 to area 1, A-phase detection coil 112 generates a positive voltage pulse. This generation pattern of the voltage pulse is a pattern that would not normally occur when the magnet reference is located in area 5. Thus, adder 126 refers to the history of the information on the detection coil that has generated the voltage pulse. When the last but one voltage pulse has been generated by A-phase detection coil 112, adder 126 estimates that a pulse dropout different from a reverse dropout has occurred in generation of the last voltage pulse held in non-volatile memory 127, not in generation of the actual last voltage pulse, and that the magnet reference has actually moved in the CW direction.

In this case, adder 126 estimates that the position of the magnet reference in generation of the last but one voltage pulse is not area 5 but is area 3, a pulse dropout has occurred immediately after the reverse of the rotation direction, and the magnet reference has moved in the CCW direction without any change. Thus, adder 126 moves the position of the magnet reference in generation of the last voltage pulse, which is held in non-volatile memory 127, to area 1 and also makes a correction to increase the number of rotations by one. Specifically, adder 126 corrects the state (current status) of the detection coil of each phase in generation of the last voltage pulse to the state of the detection coil of each phase when the magnet reference is located in area 1, and also corrects the state (last status) of the detection coil of each phase in generation of the last but one voltage pulse to the state of the detection coil of each phase when the magnet reference is located in area 2, and stores the corrected states in non-volatile memory 127. Further, adder 126 makes a correction to increase the number of rotations by one and stores the corrected number of rotations in non-volatile memory 127.

A case where the update process according to Embodiment 1 is performed in the sixth example described above will now be considered. When the magnet reference moves in the CCW direction from area 3 to area 2, the number of rotations of rotation shaft 115, the states of the detection coil of each phase in generation of the last voltage pulse and the last but one voltage pulse, and the information on the detection coil (detection coil number) that has output the voltage pulse, which are held in non-volatile memory 127, are updated. At this time, the position of the magnet reference in generation of the last voltage pulse is assumed to be area 6, and the position of the magnet reference in generation of the last but one voltage pulse is assumed to be area 5. It is also assumed that the last voltage pulse has been generated by C-phase detection coil 114 and the last but one voltage pulse has been generated by C-phase detection coil 114. Subsequently, the voltage pulse generated when the magnet reference moves in the CCW direction from area 2 to area 1 is a pattern that would not normally occur when the magnet reference is located in area 6. Since the detection coil that has generated the last but one voltage pulse does not match, this pattern does not correspond to any correction pattern, resulting in output of an error.

In contrast, the update process according to Embodiment 3 makes a correction as described above, thus allowing the device to continuously operate.

Embodiment 4

Figure 15:
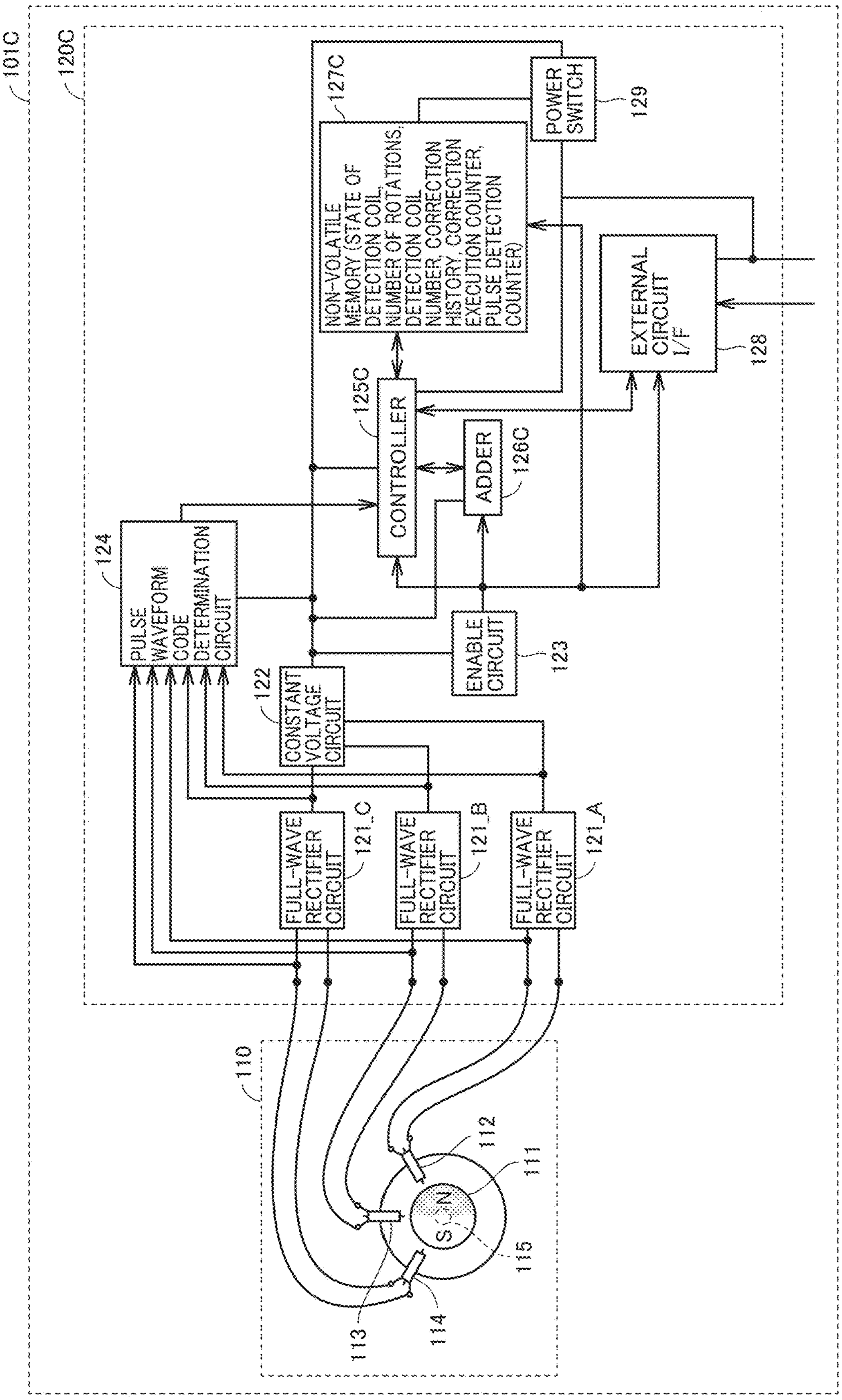
FIG. 15 shows an overall configuration of a rotation detector according to Embodiment 4.

FIG. 15 shows an overall configuration of a rotation detector according to Embodiment 4. As shown in FIG. 15, a rotation detector 101C according to Embodiment 4 is different from rotation detector 101 shown in FIG. 1 in that it includes a signal processing circuit 120C in place of signal processing circuit 120.

Signal processing circuit 120C includes a controller 125C, an adder 126C, and a non-volatile memory 127C in place of controller 125, adder 126, and non-volatile memory 127 in signal processing circuit 120 shown in FIG. 1, respectively.

Non-volatile memory 127C is configured to store the information on a correction history, in addition to the number of rotations of rotation shaft 115, the state of the detection coil of each phase in generation of a voltage pulse, and the history of the information on the detection coil (detection coil number) that has generated the voltage pulse. The information on the correction history includes the state of the detection coil of each phase when a correction has been made and the information on a detected pulse dropout. The correction history is updated every time a correction is made.

Non-volatile memory 127C includes a correction execution counter and a pulse detection counter. The correction execution counter is configured to count and store the number of times the correction has been made. The pulse detection counter is configured to count and store the number of times a voltage pulse has been generated.

Controller 125C accesses non-volatile memory 127C and reads, from non-volatile memory 127C, the number of rotations of rotation shaft 115 in generation of the last voltage pulse, the state of the detection coil of each phase in generation of the last voltage pulse and the information on the detection coil that has output the last voltage pulse, the state of the detection coil of each phase in generation of the last but one voltage pulse and the information on the detection coil that has output the last but one voltage pulse, the count values of the correction execution counter and the pulse detection counter, and the correction history. Controller 125C transmits the pieces of read information to adder 126C.

Based on the information received from controller 125C (the information on the current voltage pulse and the information read from non-volatile memory 127C), adder 126C performs the update process using the conversion table (FIGS. 12 and 13). In this update process, adder 126C increases (increments) the count value of the pulse detection counter by one.

Further, in the update process, when performing the process of correcting the state (the position of the magnet reference) of the detection coil of each phase, which is stored in non-volatile memory 127C, adder 126C increases (increments) the count value of the correction execution counter by one, and also obtains, as the correction history, the state of the detection coil of each phase at the time of the correction, and the information on the detection coil when a pulse dropout has presumably occurred.

Adder 126C then compares the count value of the pulse detection counter with the count value of the correction execution counter. When the ratio of the count value of the correction execution counter to the count value of the pulse detection counter (the count value of the correction execution counter/the count value of the pulse detection counter) exceeds a predetermined threshold, it is feared that abnormality may have occurred in the environment or a component, and thus, adder 126C outputs an error.

For example, when the count value of each counter is a binary number, adder 126C outputs an error upon the above-mentioned ratio exceeding “1/20th power of 2. When the count value of the pulse detection counter reaches an upper limit before the above-mentioned ratio reaches a threshold, each of the pulse detection counter and the correction execution counter shifts the count value to the right by one bit to reduce the count value in half, and then continues count-up. The method of adjusting the count value is not limited to the right-shift method described above, and may be, for example, a method of initializing each counter or adjusting the count value to any value.

Controller 125C accesses non-volatile memory 127C again and writes, into non-volatile memory 127C, the information (including the count value and the correction history) received from adder 126C and the history of the updated information on the detection coil.

As described above, Embodiment 4 is configured such that adder 126C outputs an error even when the corrections described in Embodiments 1 and 3 can be made. Consequently, the operation of the device can no longer be continued, but the device can be stopped safely before the occurrence of abnormality that cannot be corrected. Also, the information that leads to identification of the location of a factor can be obtained by storing the information on the correction history in non-volatile memory 127C.

The criterion for determining whether adder 126C outputs an error is not limited to the above ratio. For example, a configuration can be made such that the pulse detection counter is not implemented, but only the correction execution counter is implemented, in non-volatile memory 127C, and adder 126C outputs an error when the count value of the correction execution counter exceeds a predetermined threshold.

Instead of being configured to output an error, adder 126C may be configured to notify a warning to urge a maintenance checkup of a device via an external device while continuing an operation of the device. In addition, adder 126C can write the information on the correction history into a predetermined address of non-volatile memory 127C without reading the information on the correction history from non-volatile memory 127C.

In the present disclosure, the embodiments can be combined, or the embodiments can be modified or omitted as appropriate, within the scope of the invention. Further, the embodiments described above include inventions in various stages, and various inventions can be extracted by appropriately combining a plurality of disclosed constituent elements.

It should be understood that the embodiments disclosed herein are illustrative and non-restrictive in every respect. The technical scope indicated by the present disclosure is defined by the scope of the claims, not by the description of the embodiments above, and is intended to include any modifications within the meaning and scope equivalent to the terms of the claims.

REFERENCE SIGNS LIST

10 CPU; 11 RAM; 12 ROM; 13 I/F device; 14 storage device; 15 communication bus; 101, 101A, 101B, 101C rotation detector; 110 rotation detection mechanism; 111 magnet; 112 A-phase detection coil; 113 B-phase detection coil; 114 C-phase detection coil; 115 rotation shaft; 120, 120A, 120B, 120C signal processing circuit; 121_A, 121_B, 121_C full-wave rectifier circuit; 122 constant voltage circuit; 123 enable circuit; 124 pulse waveform code determination circuit; 125, 125A, 125B, 125C controller; 126, 126A, 126C adder; 127, 127A, 127C non-volatile memory; 128 external circuit I/F; 129 power switching circuit.

The invention claimed is:

1. A rotation detector to detect a rotation direction and a number of rotations of a rotation shaft, the rotation detector comprising:
- a rotation detection mechanism attached to the rotation shaft to detect rotations of the rotation shaft; and
- a signal processing circuit electrically connected to the rotation detection mechanism, wherein
- the rotation detection mechanism includes
  - a magnet configured to rotate in synchronization with the rotation shaft and having an N number of magnetic poles arranged in a rotation direction, and
  - an L number of detection coils arranged at positions displaced from each other by a predetermined phase in the rotation direction of the magnet, N being a natural number of two or more, L being a natural number of three or more,
- each of the L number of detection coils is configured to receive a magnetic field applied from the magnet and generate a voltage pulse of a positive or negative polarity,
- the signal processing circuit includes
  - a constant voltage circuit to generate, every time a voltage pulse is generated, a source voltage from electric power of the voltage pulse, and
  - a controller and a non-volatile memory to operate upon receipt of the source voltage,
- the non-volatile memory is configured to store states of the L number of detection coils and the number of rotations of the rotation shaft in generation of a voltage pulse, and a history of information on a detection coil that has generated the voltage pulse, the controller is configured to, every time a voltage pulse is generated, obtain the states of the L number of detection coils, the number of rotations of the rotation shaft, and the information on a detection coil that has generated the voltage pulse, and perform a process of updating the non-volatile memory, in the process of updating, by referring to information on a current voltage pulse, and states of the L number of detection coils in generation of the last voltage pulse, states of the L number of detection coils in generation of the last but one voltage pulse, and a history of information on a detection coil that has generated the last but one voltage pulse, which are held in the non-volatile memory, the controller detects a pulse dropout in which a voltage pulse drops out, and corrects the states of the L number of detection coils and the number of rotations of the rotation shaft that are to be held in the non-volatile memory, the controller is configured to change a state of each of the L number of detection coils to a first logic level upon generation of the voltage pulse of the positive polarity and to a second logic level upon generation of the voltage pulse of the negative polarity and estimate a rotational position of the magnet from the states of the L number of detection coils, and in the process of updating, the controller detects the pulse dropout and estimates a transition of the rotational position of the magnet by referring to the rotational position of the magnet estimated from each of the states of the L number of detection coils in generation of the last voltage pulse and the states of the L number of detection coils in generation of the last but one voltage pulse, and the history of the information on the detection coil that has generated the last but one voltage pulse, which are held in the non-volatile memory, and based on the estimated transition of the rotational position of the magnet, corrects the states of the L number of detection coils and the number of rotations of the rotation shaft that are to be held in the non-volatile memory.

2. The rotation detector according to claim 1, wherein, by referring to the states of the L number of detection coils in generation of the last voltage pulse, the states of the L number of detection coils in generation of the last but one voltage pulse, and the history of the information on the detection coil that has generated the last but one voltage pulse, which are held in the non-volatile memory, the controller detects the pulse dropout that has occurred during rotation of the rotation shaft in a first rotation direction and corrects the states of the L number of detection coils and the number of rotations of the rotation shaft that are to be held in the non-volatile memory.

3. The rotation detector according to claim 2, wherein the non-volatile memory is further configured to hold information indicating whether the correction has been made in the process of updating last time, and when the correction is made in the process of updating this time, the controller outputs an error when the correction has been made in the process of updating last time.

4. The rotation detector according to claim 2, wherein the signal processing circuit includes a counter to count a number of times the correction has been made, and the controller outputs an error when a count value of the counter exceeds a threshold.

5. The rotation detector according to claim 2, wherein the signal processing circuit includes a first counter to count a number of times a voltage pulse has been generated, and a second counter to count a number of times the correction has been made, and the controller outputs an error when a ratio of a count value of the second counter to a count value of the first counter exceeds a threshold.

6. The rotation detector according to claim 1, wherein by referring to the states of the L number of detection coils in generation of the last voltage pulse, the states of the L number of detection coils in generation of the last but one voltage pulse, and the history of the information on the detection coil that has generated the last but one voltage pulse, which are held in the non-volatile memory, the controller detects the pulse dropout that has occurred at least twice consecutively after the reverse of the rotation shaft from a first rotation direction to a second direction, and corrects the states of the L number of detection coils and the number of rotations of the rotation shaft that are to be held in the non-volatile memory.

7. The rotation detector according to claim 6, wherein the non-volatile memory is further configured to hold information indicating whether the correction has been made in the process of updating last time, and when the correction is made in the process of updating this time, the controller outputs an error when the correction has been made in the process of updating last time.

8. The rotation detector according to claim 6, wherein the signal processing circuit includes a counter to count a number of times the correction has been made, and the controller outputs an error when a count value of the counter exceeds a threshold.

9. The rotation detector according to claim 6, wherein the signal processing circuit includes a first counter to count a number of times a voltage pulse has been generated, and a second counter to count a number of times the correction has been made, and the controller outputs an error when a ratio of a count value of the second counter to a count value of the first counter exceeds a threshold.

10. The rotation detector according to claim 1, wherein the non-volatile memory is further configured to hold information indicating whether the correction has been made in the process of updating last time, and when the correction is made in the process of updating this time, the controller outputs an error when the correction has been made in the process of updating last time.

11. The rotation detector according to claim 1, wherein the signal processing circuit includes a counter to count a number of times the correction has been made, and the controller outputs an error when a count value of the counter exceeds a threshold.

12. The rotation detector according to claim 1, wherein the signal processing circuit includes a first counter to count a number of times a voltage pulse has been generated, and a second counter to count a number of times the correction has been made, and the controller outputs an error when a ratio of a count value of the second counter to a count value of the first counter exceeds a threshold.

13. The rotation detector according to claim 1, wherein the non-volatile memory is configured to hold the states of the L number of detection coils at the correction and information on the pulse dropout, and the controller updates the correction history when the correction is made.

14. A rotation detector to detect a rotation direction and a number of rotations of a rotation shaft, the rotation detector comprising:

a rotation detection mechanism attached to the rotation shaft to detect rotations of the rotation shaft; and a signal processing circuit electrically connected to the rotation detection mechanism. wherein the rotation detection mechanism includes a magnet configured to rotate in synchronization with the rotation shaft and having an N number of magnetic poles arranged in a rotation direction, and an L number of detection coils arranged at positions displaced from each other by a predetermined phase in the rotation direction of the magnet, N being a natural number of two or more, L being a natural number of three or more, each of the L number of detection coils is configured to receive a magnetic field applied from the magnet and generate a voltage pulse of a positive or negative polarity, the signal processing circuit includes a constant voltage circuit to generate, every time a voltage pulse is generated, a source voltage from electric power of the voltage pulse, and a controller and a non-volatile memory to operate upon receipt of the source voltage, the non-volatile memory is configured to store states of the L number of detection coils and the number of rotations of the rotation shaft in generation of a voltage pulse, and a history of information on a detection coil that has generated the voltage pulse, the controller is configured to, every time a voltage pulse is generated, obtain the states of the L number of detection coils, the number of rotations of the rotation shaft, and the information on a detection coil that has generated the voltage pulse, and perform a process of updating the non-volatile memory, in the process of updating, by referring to information on a current voltage pulse, and states of the L number of detection coils in generation of the last voltage pulse, states of the L number of detection coils in generation of the last but one voltage pulse, and a history of information on a detection coil that has generated the last but one voltage pulse, which are held in the non-volatile memory, the controller detects a pulse dropout in which a voltage pulse drops out, and corrects the states of the L number of detection coils and the number of rotations of the rotation shaft that are to be held in the non-volatile memory, and the controller does not update the non-volatile memory when a detection coil that has generated the last voltage pulse is identical to the detection coil that has generated the last but one voltage pulse.

* * * * *